(12) United States Patent
Liu et al.

(10) Patent No.: US 12,468,102 B2
(45) Date of Patent: Nov. 11, 2025

(54) OPTICAL MODULE

(71) Applicant: HISENSE BROADBAND MULTIMEDIA TECHNOLOGIES CO., LTD., Shandong (CN)

(72) Inventors: Weiwei Liu, Shandong (CN); Qian Shao, Shandong (CN); Liu Yang, Shandong (CN); Tao Wu, Shandong (CN)

(73) Assignee: Hisense Broadband Multimedia Technologies Co., Ltd., Shandong (CN)

( * ) Notice: Subject to any disclaimer, the term of this patent is extended or adjusted under 35 U.S.C. 154(b) by 468 days.

(21) Appl. No.: 17/893,036

(22) Filed: Aug. 22, 2022

(65) Prior Publication Data

US 2022/0404563 A1 Dec. 22, 2022

Related U.S. Application Data

(63) Continuation of application No. PCT/CN2021/098265, filed on Jun. 4, 2021.

(30) Foreign Application Priority Data

| Sep. 11, 2020 | (CN) | 202010953872.5 |
| Sep. 11, 2020 | (CN) | 202010953988.9 |
| Sep. 11, 2020 | (CN) | 202021992828.7 |

(51) Int. Cl.
*G02B 6/42* (2006.01)
*H01S 5/02* (2006.01)
(Continued)

(52) U.S. Cl.
CPC ........... *G02B 6/428* (2013.01); *G02B 6/4204* (2013.01); *G02B 6/4244* (2013.01);
(Continued)

(58) Field of Classification Search
CPC .... G02B 6/428; G02B 6/4204; G02B 6/4244; G02B 6/4269; H01S 5/0233; H01S 5/021; H01S 5/141
See application file for complete search history.

(56) References Cited

U.S. PATENT DOCUMENTS 2,924,481 A * 2/1960 Wagstaff .................. H01K 3/32
81/53.11
4,741,796 A * 5/1988 Althaus ................ G02B 6/4236
385/91

(Continued)

FOREIGN PATENT DOCUMENTS

| CN | 1721899 A | 1/2006 |
| CN | 104937790 A | 9/2015 |

(Continued)

OTHER PUBLICATIONS

Wang et al., "Compact GaSb/silicon-on-insulator 2.0x μm widely tunable external cavity lasers," Opt. Express 24, 28977-28986 (2016) (Year: 2016).*

(Continued)

*Primary Examiner* — Peter Radkowski
(74) *Attorney, Agent, or Firm* — Harness, Dickey & Pierce, P.L.C.

(57) ABSTRACT

The present disclosure discloses an optical module including a circuit board and a light-emitting assembly. In the light-emitting assembly, a wavelength tuning mechanism is formed of a semiconductor optical amplification chip, a silicon optical chip and a semiconductor refrigerator. The semiconductor optical amplification chip may provide a plurality of wavelengths, and a wavelength selection is carried out by an optical filter in the silicon optical chip; a temperature adjustment for the optical filter is achieved by the semiconductor refrigerator, so as to further adjust a (Continued)

performance of the filter for wavelength selection. The above device is provided in a housing to facilitate packaging of the devices.

12 Claims, 12 Drawing Sheets

(51) Int. Cl.
*H01S 5/0233* (2021.01)
*H01S 5/14* (2006.01)
(52) U.S. Cl.
CPC ............ *G02B 6/4269* (2013.01); *H01S 5/021* (2013.01); *H01S 5/0233* (2021.01); *H01S 5/141* (2013.01)

(56) References Cited

U.S. PATENT DOCUMENTS

| | | | | |
|---|---|---|---|---|
| 4,888,081 A * | 12/1989 | Althaus | ................. | G02B 6/4204 156/359 |
| 5,020,873 A * | 6/1991 | Althaus | ................. | G02B 6/4236 219/229 |
| 6,240,235 B1 * | 5/2001 | Uno | ..................... | G02B 6/3839 385/83 |
| 6,299,362 B1 * | 10/2001 | Gilliland | ............ | H01R 13/6658 385/92 |
| 6,502,999 B1 * | 1/2003 | Cohen | .................. | G02B 6/4251 385/94 |
| 6,586,678 B1 * | 7/2003 | Rosenberg | .......... | H01S 5/02212 257/E23.19 |
| 6,821,027 B2 * | 11/2004 | Lee | ..................... | G02B 6/4283 385/94 |
| 6,864,553 B2 * | 3/2005 | Epitaux | .............. | H01S 5/02216 257/434 |
| 6,958,907 B2 * | 10/2005 | Sato | ..................... | G02B 6/4266 361/708 |
| 6,994,478 B1 * | 2/2006 | Chiu | ..................... | G02B 6/4292 385/88 |
| 7,042,082 B2 * | 5/2006 | Epitaux | .............. | H01S 5/02216 257/703 |
| 7,210,859 B2 * | 5/2007 | Kumar | ................ | H01S 5/02375 257/E23.19 |
| 7,322,754 B2 * | 1/2008 | Wolf | ..................... | G02B 6/4214 385/94 |
| RE40,150 E * | 3/2008 | Ishibashi | ............. | G02B 6/4246 361/785 |
| RE40,154 E * | 3/2008 | Ishibashi | ............. | G02B 6/4246 361/785 |
| 9,036,962 B2 * | 5/2015 | De Boer | ............. | B32B 38/0012 385/80 |
| 9,148,226 B2 * | 9/2015 | Sato | ..................... | G02B 6/4271 |
| 9,207,415 B2 * | 12/2015 | Kuang | ................ | G02B 6/4281 |
| 9,229,169 B2 * | 1/2016 | Doany | ................. | H01L 21/302 |
| 9,250,399 B2 * | 2/2016 | Margolin | ............. | G02B 6/4256 |
| 9,423,570 B2 * | 8/2016 | Petersen | ............. | G02B 6/3895 |
| 9,457,549 B2 * | 10/2016 | De Boer | ............. | B32B 37/142 |
| 9,500,814 B2 * | 11/2016 | Pepe | ................... | H01R 12/7076 |
| 9,557,500 B1 * | 1/2017 | Luo | ..................... | H04B 10/40 |
| 9,568,679 B2 * | 2/2017 | Doany | ................. | G02B 6/32 |
| 9,577,410 B2 * | 2/2017 | Yamazaki | ............ | H01S 5/142 |
| 9,602,210 B2 * | 3/2017 | Berlin | ................ | H04Q 11/0005 |
| 9,722,397 B2 * | 8/2017 | Takabayashi | .......... | H01S 5/142 |
| 9,753,229 B2 * | 9/2017 | Murray | ............... | G02B 6/3863 |
| 9,929,810 B2 * | 3/2018 | Berlin | ................ | H04Q 11/0005 |
| 9,995,883 B2 * | 6/2018 | Pepe | ................... | G02B 6/3817 |
| 9,995,892 B2 * | 6/2018 | Xu | ....................... | G02B 6/4292 |
| 10,012,813 B2 * | 7/2018 | Petersen | ............ | G02B 6/44524 |
| 10,018,794 B2 * | 7/2018 | Sun | ..................... | G02B 6/4206 |
| 10,171,170 B2 * | 1/2019 | Luo | ..................... | G02B 6/425 |
| 10,177,528 B1 * | 1/2019 | Morita | ................ | H01L 23/00 |
| 10,185,094 B2 * | 1/2019 | Isenhour | ............. | G02B 6/3817 |
| 10,281,665 B2 * | 5/2019 | Hino | .................. | H01R 13/6581 |
| 10,333,037 B2 * | 6/2019 | Morita | .................... | H01L 33/54 |
| 10,495,832 B2 * | 12/2019 | Sun | ........................ | G02B 6/428 |
| 10,509,177 B2 * | 12/2019 | Pepe | .............. | H01R 12/716 |
| 10,541,758 B2 * | 1/2020 | Goergen | ................ | H02J 50/80 |
| 10,571,641 B2 * | 2/2020 | Petersen | ............ | G02B 6/44528 |
| 10,577,130 B1 * | 3/2020 | Parish | ..................... | B64G 1/64 |
| 10,637,208 B1 * | 4/2020 | Nagarajan | ............ | H01S 5/0656 |
| 10,672,537 B2 * | 6/2020 | Goergen | ................ | H01B 9/005 |
| 10,678,001 B2 * | 6/2020 | Smrha | .................. | G02B 6/4452 |
| 10,746,948 B1 * | 8/2020 | Huang | ................ | G02B 6/4269 |
| 10,761,262 B2 * | 9/2020 | Byrd | .................... | G02B 6/4272 |
| 10,791,620 B2 * | 9/2020 | Chen | .................... | H05K 1/0216 |
| 10,819,084 B2 * | 10/2020 | Zhang | ................ | H01S 5/02415 |
| 10,914,901 B2 * | 2/2021 | Heroux | ............... | G02B 6/4238 |
| 11,143,833 B2 * | 10/2021 | Petersen | ............ | G02B 6/3817 |
| 11,212,013 B2 * | 12/2021 | Goergen | ................ | H04L 12/12 |
| 11,231,555 B2 * | 1/2022 | Smrha | .................. | G02B 6/4455 |
| 11,262,498 B2 * | 3/2022 | Byrd | .................... | H04B 10/25 |
| 11,329,452 B2 * | 5/2022 | Nagarajan | ............ | H01S 5/0612 |
| 11,460,647 B2 * | 10/2022 | Heroux | ................ | G02B 6/422 |
| 11,630,269 B2 * | 4/2023 | Smrha | .................. | G02B 6/4455 385/35 |
| 11,714,246 B2 * | 8/2023 | Petersen | ............ | G02B 6/3825 385/88 |
| 11,784,459 B2 * | 10/2023 | Yamamoto | ............ | H01S 5/0235 372/44.01 |
| 11,811,195 B2 * | 11/2023 | Gao | ...................... | H01S 5/142 |
| 11,838,060 B2 * | 12/2023 | Goergen | ............... | H02J 50/30 |
| 12,160,275 B2 * | 12/2024 | Goergen | ................ | H04L 12/12 |
| 2004/0021217 A1 * | 2/2004 | Epitaux | ............... | H01S 5/02216 438/26 |
| 2004/0062491 A1 * | 4/2004 | Sato | ..................... | G02B 6/4266 385/88 |
| 2004/0105633 A1 * | 6/2004 | Ishikawa | .............. | G02B 6/4277 385/92 |
| 2005/0084202 A1 | 4/2005 | Smith et al. | | |
| 2005/0123251 A1 * | 6/2005 | Epitaux | ............... | H01S 5/02216 385/88 |
| 2005/0244111 A1 * | 11/2005 | Wolf | .................... | G02B 6/4214 385/14 |
| 2005/0265650 A1 * | 12/2005 | Priyadarshi | ............ | H05K 1/148 385/14 |
| 2006/0285806 A1 * | 12/2006 | Ahrens | ................ | G02B 6/4284 385/92 |
| 2009/0297159 A1 * | 12/2009 | Margolin | ............. | G02B 6/4251 385/88 |
| 2012/0099816 A1 * | 4/2012 | Wilson | ................. | H01S 5/02251 385/33 |
| 2012/0128290 A1 * | 5/2012 | Han | ..................... | G02B 6/4208 385/14 |
| 2013/0043413 A1 * | 2/2013 | De Boer | ............. | H01J 37/3177 156/196 |
| 2013/0084039 A1 * | 4/2013 | Doany | ................. | H01L 21/302 438/31 |
| 2013/0193304 A1 * | 8/2013 | Yu | .......................... | G02B 6/428 250/206 |
| 2014/0147085 A1 * | 5/2014 | Lim | ..................... | G02B 6/4249 29/831 |
| 2015/0078408 A1 * | 3/2015 | Bukkems | ............. | G02B 6/4257 372/20 |
| 2015/0190994 A1 * | 7/2015 | De Boer | ............. | B32B 37/1284 156/196 |
| 2015/0256259 A1 * | 9/2015 | Huang | ................ | G02B 6/4261 398/139 |
| 2015/0316732 A1 * | 11/2015 | Schamuhn | ............. | H04B 10/40 398/139 |
| 2015/0372453 A1 * | 12/2015 | Yamazaki | ................. | G02F 2/00 359/344 |
| 2016/0077287 A1 * | 3/2016 | Isenhour | ............. | G02B 6/3825 385/76 |
| 2016/0156149 A1 * | 6/2016 | Takabayashi | ........... | H01S 5/142 372/6 |
| 2016/0291272 A1 * | 10/2016 | Sun | ..................... | H05K 3/4691 |
| 2017/0003453 A1 * | 1/2017 | Doany | ................. | G02B 6/30 |
| 2017/0168252 A1 * | 6/2017 | Pezeshki | ............. | G02B 6/428 |
| 2017/0187462 A1 * | 6/2017 | Luo | ..................... | G02B 6/4246 |
| 2017/0248763 A1 * | 8/2017 | Kawamura | ............ | G02B 6/425 |

(56) References Cited

U.S. PATENT DOCUMENTS

| | | | |
|---|---|---|---|
| 2017/0351044 A1* | 12/2017 | Xu | G02B 6/4256 |
| 2018/0023779 A1* | 1/2018 | Seif | H01L 33/648 |
| | | | 257/88 |
| 2018/0284373 A1* | 10/2018 | Lin | G02B 6/4277 |
| 2019/0013641 A1* | 1/2019 | Morita | H01S 5/02216 |
| 2019/0019925 A1* | 1/2019 | Morita | H01L 33/62 |
| 2019/0029102 A1* | 1/2019 | Chen | H05K 1/021 |
| 2019/0041576 A1* | 2/2019 | Byrd | G02B 6/12004 |
| 2019/0044299 A1* | 2/2019 | Kazav | H01R 27/00 |
| 2019/0113695 A1* | 4/2019 | Heroux | G02B 6/428 |
| 2019/0190605 A1* | 6/2019 | Zhang | G06F 1/20 |
| 2019/0214784 A1* | 7/2019 | Yamamoto | H01L 23/12 |
| 2020/0044751 A1* | 2/2020 | Goergen | H04L 12/12 |
| 2020/0144790 A1* | 5/2020 | Nagarajan | H01S 5/06256 |
| 2020/0195350 A1* | 6/2020 | Matsui | G02B 6/4281 |
| 2020/0203922 A1* | 6/2020 | Zhang | H01S 5/02212 |
| 2020/0212651 A1* | 7/2020 | Nagarajan | H01S 5/1007 |
| 2020/0280173 A1* | 9/2020 | Gao | H01S 5/02415 |
| 2021/0116652 A1* | 4/2021 | Heroux | G02B 6/423 |
| 2022/0094135 A1* | 3/2022 | Yamamoto | H01L 23/49827 |
| 2022/0263289 A1* | 8/2022 | Nagarajan | H01S 5/0261 |

FOREIGN PATENT DOCUMENTS

| | | | | |
|---|---|---|---|---|
| CN | 107611774 A | 1/2018 | | |
| CN | 109884754 A | 6/2019 | | |
| CN | 110350394 A | 10/2019 | | |
| CN | 110376691 A | 10/2019 | | |
| CN | 111146683 A | 5/2020 | | |
| CN | 111474644 A | 7/2020 | | |
| CN | 213122371 U | 5/2021 | | |
| CN | 113557643 A | 10/2021 | | |
| EP | 2924481 A1 * | 9/2015 | | G02B 6/12004 |
| WO | WO-2018219318 A1 * | 12/2018 | | H01S 5/022 |

OTHER PUBLICATIONS

Sia et al., "Compact silicon photonic hybrid ring external cavity (SHREC)/InGaSb—AlGaAsSb wavelength-tunable laser diode operating from 1881-1947 nm," Opt. Express 28, 5134-5146 (2020) (Year: 2020).*

Zhang, L., English language translation of WO-2018219318-A1—corresponds to US-20200203922-A1 (Year: 2018).*

Chinese Office Action & Search Report in Chinese regarding Application No. 202010953872.5 dated Jul. 5, 2022. English translation of the Search Report provided by Chinable IP.

Office Action and Search Report in Chinese regarding Application No. 202010953988.9 dated Oct. 10, 2022. English translation of the Search Report provided by Chinable IP.

* cited by examiner

OPTICAL MODULE

CROSS-REFERENCE TO RELATED APPLICATION

This application is a continuation of PCT/CN2021/098265, filed on Jun. 4, 2021, which claims priority to Chinese Application No. 202010953988.9, filed on Sep. 11, 2020, and Chinese Application No. 202010953872.5, filed on Sep. 11, 2020, and Chinese Application No. 202021992828.7, filed on Sep. 11, 2020, which are incorporated herein by reference in their entireties.

FIELD OF THE PRESENT DISCLOSURE

The present disclosure relates to the field of optical communication technology, and in particular, to an optical module.

BACKGROUND OF THE PRESENT DISCLOSURE

One of the key aspect of optical fiber communication is conversion between optical signals and electrical signals. In optical fiber communication, an optical signal carrying various information is transmitted within an information transmission device such as an optical fiber/optical waveguide, wherein benefit from passive transmission properties of light in optical fiber/optical waveguide, a low-cost and low-loss transmission of information can be achieved. On the other hand, electrical signals are used in an information processing device such as a computer. In order to establish an information connection between the information transmission device such as an optical fiber/optical waveguide and the information processing device such as the computer, a mutual conversion between the electrical signal and the optical signal is needed.

In the field of optical fiber communication, an optical module is used to realize the above-mentioned mutual conversion function of between optical and electrical signals, and the mutual conversion between the optical signals and the electrical signals is the core function of the optical module. The optical module realizes an electrical connection with an external host computer via golden fingers on its internal circuit board. Main electrical connections include power supply, I2C signals, data information and grounding, etc. An electrical connection via golden fingers has become the mainstream way of connection in the optical module industry, and based on this, definition of pins on the golden fingers have formed a variety of industry protocols/norms.

In optical fiber communication, wavelength-tunable optical modules have been widely studied. A wavelength tunable optical module can not only make full use of broadband resources of optical fibers in a DWDM (Dense Wave Length Division Multiplexing) system, improve communication capacity of the network system greatly, but also is more flexible in procedures such as networking and stock preparation as compared with a DWDM optical module of fixed wavelength; meanwhile, it can also act as a backup light source for traditional DWDM systems, and is a key aspect in intelligent optical network.

SUMMARY OF THE PRESENT DISCLOSURE

In a first aspect, an embodiment of the present disclosure discloses an optical module, including: a circuit board; a light-emitting assembly, which is electrically connected to the circuit board through a flexible circuit board for emitting signal light; wherein the light-emitting assembly includes: a housing, a side wall of which is provided with a notch through which the flexible circuit board is electrically connected to an interior of the housing; a semiconductor refrigerator provided on a bottom surface of the housing for temperature adjustment; a silicon optical chip provided on a surface of the semiconductor refrigerator, which may perform light modulation to generate a signal light, wherein the silicon optical chip includes a filter, a light inputting port and a light outputting port, and light inside the silicon optical chip passes through the filter; and a semiconductor optical amplification chip provided on the surface of the semiconductor refrigerator, wherein light of multiple wavelengths emitted by the semiconductor optical amplification chip can propagate into the silicon optical chip through the light inputting port; and a converging lens configured for converging light emitted from the light outputting port of the silicon optical chip.

In a second aspect, an embodiment of the present disclosure discloses an optical module, including: a circuit board; a light-emitting assembly, which is electrically connected to the circuit board through a flexible circuit board for emitting signal light; wherein the light-emitting assembly includes: a housing on which a notch is provided, wherein a metallized ceramic is provided at the notch and is hermetically engaged with the notch; wherein pins are provided on an outer wall of the metallized ceramic, with the flexible circuit board being electrically connected with the pins; wherein a pad is provided in the metallized ceramic; a semiconductor optical amplification chip, which is provided in the housing for emitting light of multiple wavelengths; a transfer ceramic board provided in the housing, wherein the semiconductor optical amplification chip is connected to the transfer ceramic board via gold wire bondings, and the transfer ceramic board is connected to the pad via gold wire bondings; a silicon optical chip, which is provided in the housing and connected to the pad via gold wire bondings to carry out a wavelength selection for the light of multiple wavelengths, wherein the wavelength-selected light is modulated to obtain signal light of corresponding wavelength.

In a third aspect, an embodiment of the present disclosure discloses an optical module, including: a circuit board; a light-emitting assembly, which is electrically connected to the circuit board through a flexible circuit board for emitting signal light; wherein the light-emitting assembly includes: a housing, on which is provided with an insertion hole, wherein the flexible circuit board is inserted into the housing through the insertion hole; a semiconductor optical amplification chip provided in the housing for emitting light of multiple wavelengths; a transfer ceramic provided in the housing, wherein the semiconductor optical amplification chip is connected to the transfer ceramic via gold wire bondings, and the transfer ceramic is connected to the flexible circuit board via gold wire bondings; a silicon optical chip, which is provided in the housing and connected to the flexible circuit board via gold wire bondings to carry out a wavelength selection for the light of multiple wavelengths, wherein the wavelength-selected light is modulated to obtain signal light of corresponding wavelength.

DETAILED DESCRIPTION OF THE EMBODIMENTS

Hereinafter, technical solutions in some embodiments of the present disclosure will be described clearly and completely in conjunction with the accompanying drawings. Obviously, the described embodiments are merely some but not all embodiments of the present disclosure. All other embodiments obtained by a person of ordinary skill in the art based on the embodiments of the present disclosure without involving inventive effort are within the scope of the present disclosure.

Figure 1:
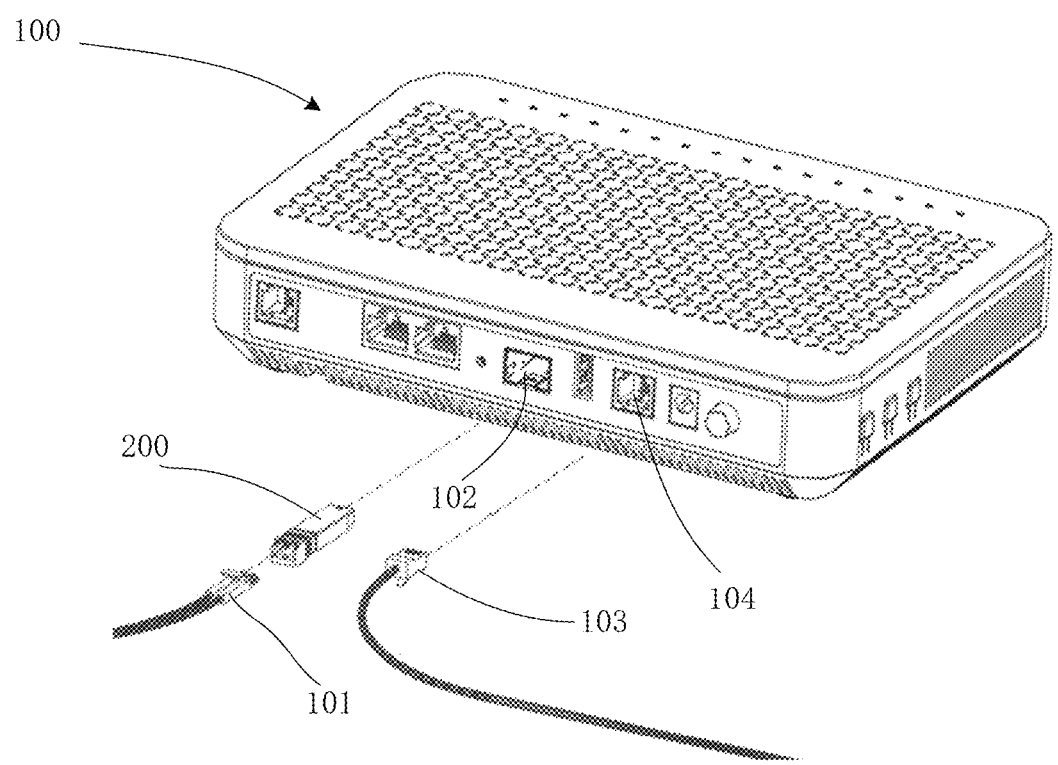
FIG. 1 is a schematic view illustrating a connection relationship of an optical communication terminal.

FIG. 1 is a schematic diagram illustrating a connection relationship of optical communication terminals. As shown in FIG. 1, the connection of an optical communication terminal mainly includes interconnections between an optical network terminal 100, an optical module 200, an optical fiber 101, and a network cable 103.

One end of the optical fiber 101 is connected to a remote server. One end of the network cable 103 is connected to a local information processing device. The connection between the local information processing device and the remote server is completed by the connection between the optical fiber 101 and the network cable 103. The connection between the optical fiber 101 and the network cable 103 is completed by the optical network terminal 100 having the optical module 200.

An optical port of the optical module 200 externally accesses the optical fiber 101, and establishes a bi-directional optical signal connection with the optical fiber 101. An electrical port of the optical module 200 externally accesses the optical network terminal 100, and establishes a bi-directional electrical signal connection with the optical network terminal 100. A mutual conversion between the optical signal and the electrical signal is achieved within the optical module to establish an information connection between the optical fiber 101 and the optical network terminal 100. In some embodiments of the present disclosure, an optical signal from the optical fiber 101 is converted into an electrical signal by the optical module 200 and input into the optical network terminal 100, and an electrical signal from the optical network terminal 100 is converted into an optical signal by the optical module 200 and input into the optical fiber 101.

The optical network terminal 100 has an optical module interface 102 configured for accessing the optical module 200 to establish a bi-directional electrical signal connection with the optical module 200. The optical network terminal 100 has a network cable interface 104 configured for accessing the network cable 103 to establish a bi-directional electrical signal connection with the network cable 103. A connection between the optical module 200 and the network cable 103 is established via the optical network terminal 100. In some embodiments of the present disclosure, the optical network terminal transmits signals from the optical module to the network cable, and transmits signals from the network cable to the optical module. The optical network terminal acts as an upper computer of the optical module to monitor the operation of the optical module.

So far, the remote server establishes a bi-directional signal transmission channel with the local information processing device via the optical fiber 101, the optical module 200, the optical network terminal 100, and the network cable 103.

A conventional information processing device comprises a router, a switch, an electronic computer, and etc. The optical network terminal is an upper computer of the optical module, providing data signals to the optical module and receiving data signals from the optical module. A common upper computer of the optical module can also be an optical line terminal, etc.

Figure 2:
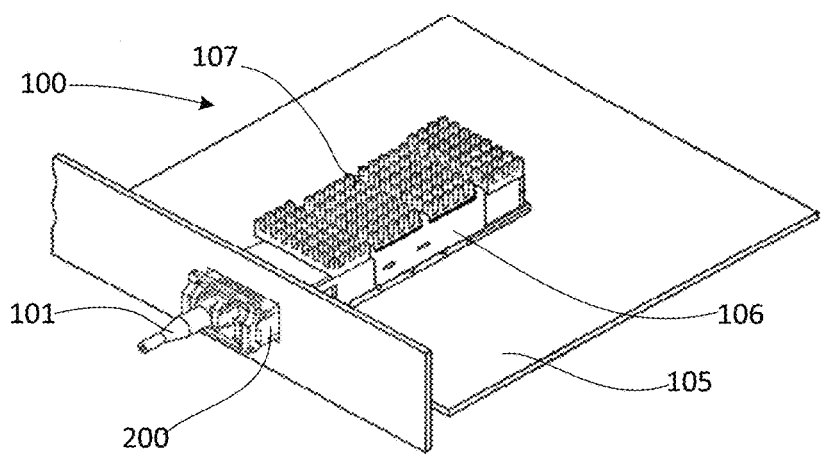
FIG. 2 is a schematic structural diagram illustrating an optical network terminal.

FIG. 2 is a schematic structural diagram illustrating an optical network terminal. As shown in FIG. 2, the optical network terminal 100 is provided with a circuit board 105 therein, and a cage 106 is provided on the surface of the circuit board 105. An electrical connector is provided inside the cage 106, configured for accessing an electrical port of the optical module such as a golden finger, etc. The cage 106 is provided with a heat sink 107 having a protrusion such as fins that increase a heat dissipating area.

The optical module 200 is inserted into the optical network terminal 100. Specifically, the electrical port of the optical module is inserted into an electrical connector inside the cage 106, and the optical port of the optical module is connected to the optical fiber 101.

The cage 106 is located on the circuit board, and the electrical connector on the circuit board is enclosed in the cage such that the electrical connector is provided inside the cage. The optical module is inserted into the cage, so that the optical module is fixed by the cage. The heat generated by the optical module is conducted to the cage 106 and then dissipated by the heat sink 107 on the cage.

Figure 3:
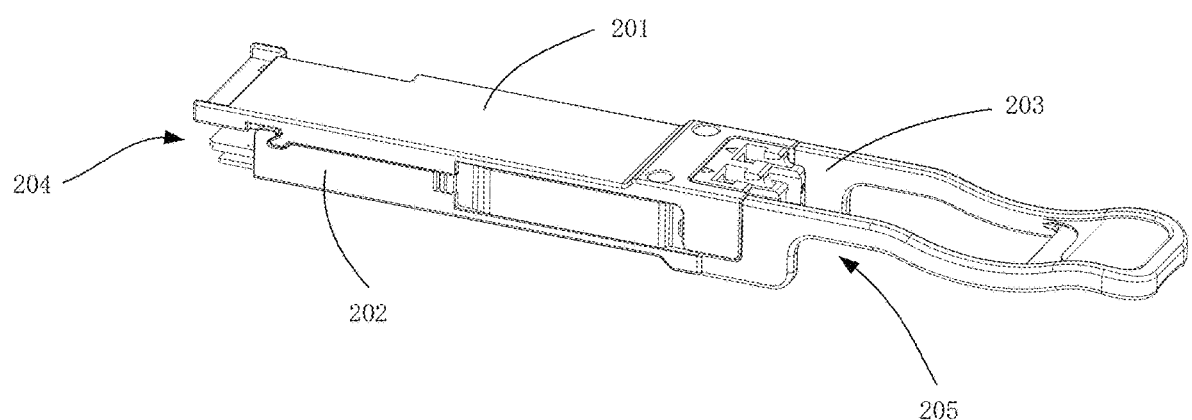
FIG. 3 is a schematic structural diagram of an optical module according to an embodiment of the present disclosure.
Figure 4:
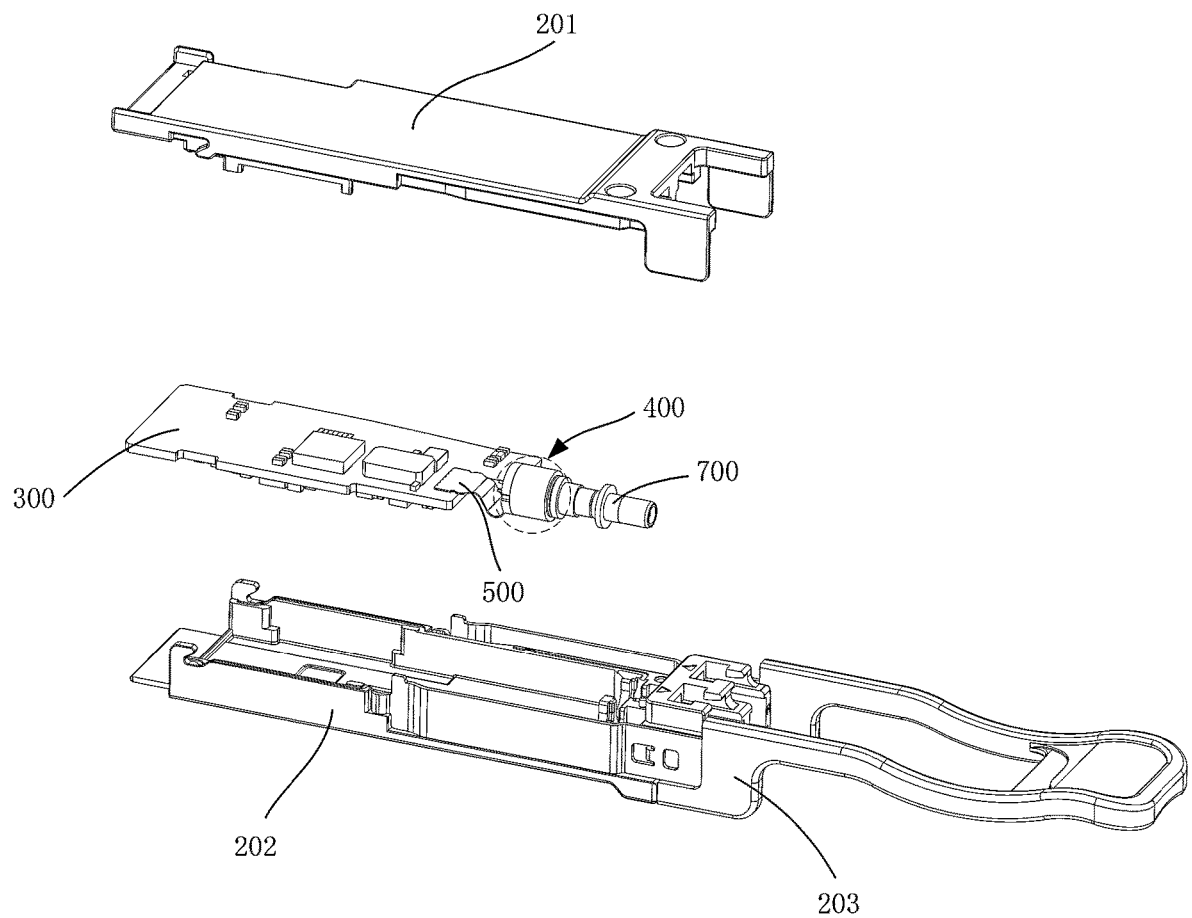
FIG. 4 is a schematic exploded diagram of the optical module according to an embodiment of the present disclosure.

FIG. 3 is a schematic structural diagram of an optical module according to an embodiment of the present disclosure. FIG. 4 is a schematic exploded diagram of the optical module according to an embodiment of the present disclosure. As shown in FIGS. 3 and 4, an embodiment of the present disclosure provides an optical module 200 including an upper housing 201, a lower housing 202, an unlocking component 203, a circuit board 300, a light emitting component 400, and an optical fiber adapter 700.

The upper housing 201 is covered and engaged on the lower housing 202 so as to form an enclosed chamber with two openings. The outer contour of the enclosed chamber generally takes the form of a rectangular body. In some embodiments of the present disclosure, the lower housing 202 includes a main plate, and two lower side plates provided to be perpendicular to the main plate and located on two sides of the main plate. The upper housing comprises a cover plate, and the cover plate is covered and engaged on the two side plates of the lower housing to form the enclosed chamber. The upper housing may further comprise two upper side plates provided to be perpendicular to the cover plate and located on two sides of the cover plate, and the two upper side plates are engaged with the two lower side plates such that the upper housing 201 is covered and engaged on the lower housing 202.

Specifically, the two openings may be openings (204, 205) at both ends of the optical module in the same direction, or two openings in different directions of the optical module; the aforementioned same direction refers to a direction in which a connection line between the openings 203 and 2044 extends, and this direction is consistent with the length direction of the optical module 200; the aforementioned different directions mean that the direction in which the connection line between the openings 204 and 205 extends is different from the length direction of the optical module 200; for example, the opening 205 is located at an end surface of the optical module 200, while the opening 204 is located at a side of the optical module 200. Exemplarily, the opening 204 is an electrical port from which the golden fingers of the circuit board protrude and are inserted into a host computer such as an optical network terminal; the opening 205 is an optical port configured for receiving external optical fibers such that they may access the light-emitting assembly 400 inside the optical module. Optoelectronic devices such as the circuit board 300, the light-emitting assembly 400, the optical fiber adapter 700, etc. are located within the enclosed chamber.

The assembling mode for engaging the upper housing with the lower housing is used to facilitate a mounting of devices such as the circuit board 300, the light-emitting assembly 400, the optical fiber adapter 700, etc. into the housing, and the upper housing and the lower housing form a packaged protective housing at the outermost of the module. The upper housing and the lower housing are generally made of a metal material to achieve electromagnetic shielding and heat dissipation. The housing of the optical module is generally not made into an integral component; otherwise, it would be impossible to mount positioning components, heat dissipation components, and electromagnetic shielding components during assembly of devices such as the circuit board, and it is not advantageous for production automation.

The unlocking component 203 is located on an outer wall of the enclosed chamber/lower housing 202, configured for establishing a fixed connection between the optical module and the upper computer or releasing the fixed connection between the optical module and the upper computer.

The unlocking component 203 has an engaging component matched with the cage of the upper computer. The unlocking component may move relatively on a surface of the outer wall by pulling an end of the unlocking component. The optical module is inserted into the cage of the upper computer, and is fixed in the cage of the upper computer via the engaging component of the unlocking component 203. By pulling the unlocking component 203, the engaging component of the unlocking component 203 will move along therewith, thereby changing the connection relationship between the engaging component and the upper computer, so as to release the engaging relationship between the optical module and the upper computer, such that the optical module can be pulled out of the cage of the upper computer.

Circuit traces, electronic elements (such as capacitors, resistors, triodes, and MOS transistors) and chips (such as an MCU, a laser driving chip, a limiting amplifier chip, a clock data recovery CDR, a power management chip, and a data processing chip DSP), etc. are provided on the circuit board 300.

The circuit board 300 is provided with a signal circuit for electrical connection of the signals. The circuit board 300 connects the electrical devices in the optical module together according to a circuit design via circuit traces so as to realize electrical functions such as power supply, electrical signal transmission, and grounding, etc.

The circuit board is generally a rigid circuit board. The rigid circuit board can also achieve a load-bearing function due to its relatively hard material; for example, the rigid circuit board can stably carry a chip. When an optical transceiver assembly is located on the circuit board, the rigid circuit board can also provide a stable load-bearing. The rigid circuit board can also be inserted into the electrical connector in the cage of the upper computer. In some embodiments of the present disclosure, metal pins/gold fingers are formed on an end surface at one side of the rigid circuit board, and are configured for connecting with the electrical connector. These are not easily achievable with a flexible circuit board.

Some optical modules may also use a flexible circuit board as a supplement to rigid circuit boards. The flexible circuit board is generally used in cooperation with the rigid circuit board; for example, a flexible circuit board may be used to connect the rigid circuit board with the optical transceiver assembly.

Figure 5:
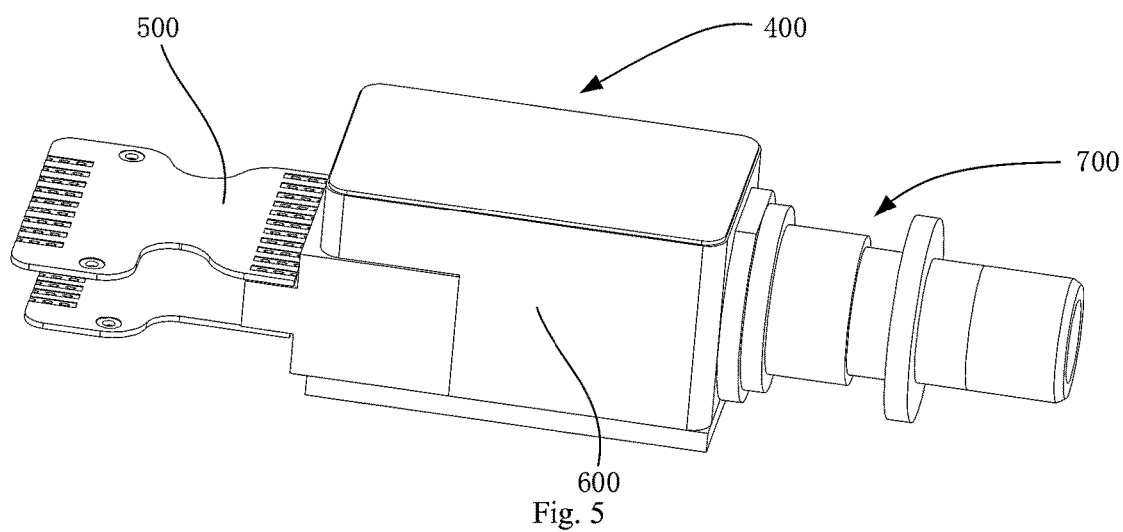
FIG. 5 is a schematic structural diagram of a light-emitting assembly in an optical module according to an embodiment of the present disclosure.
Figure 6:
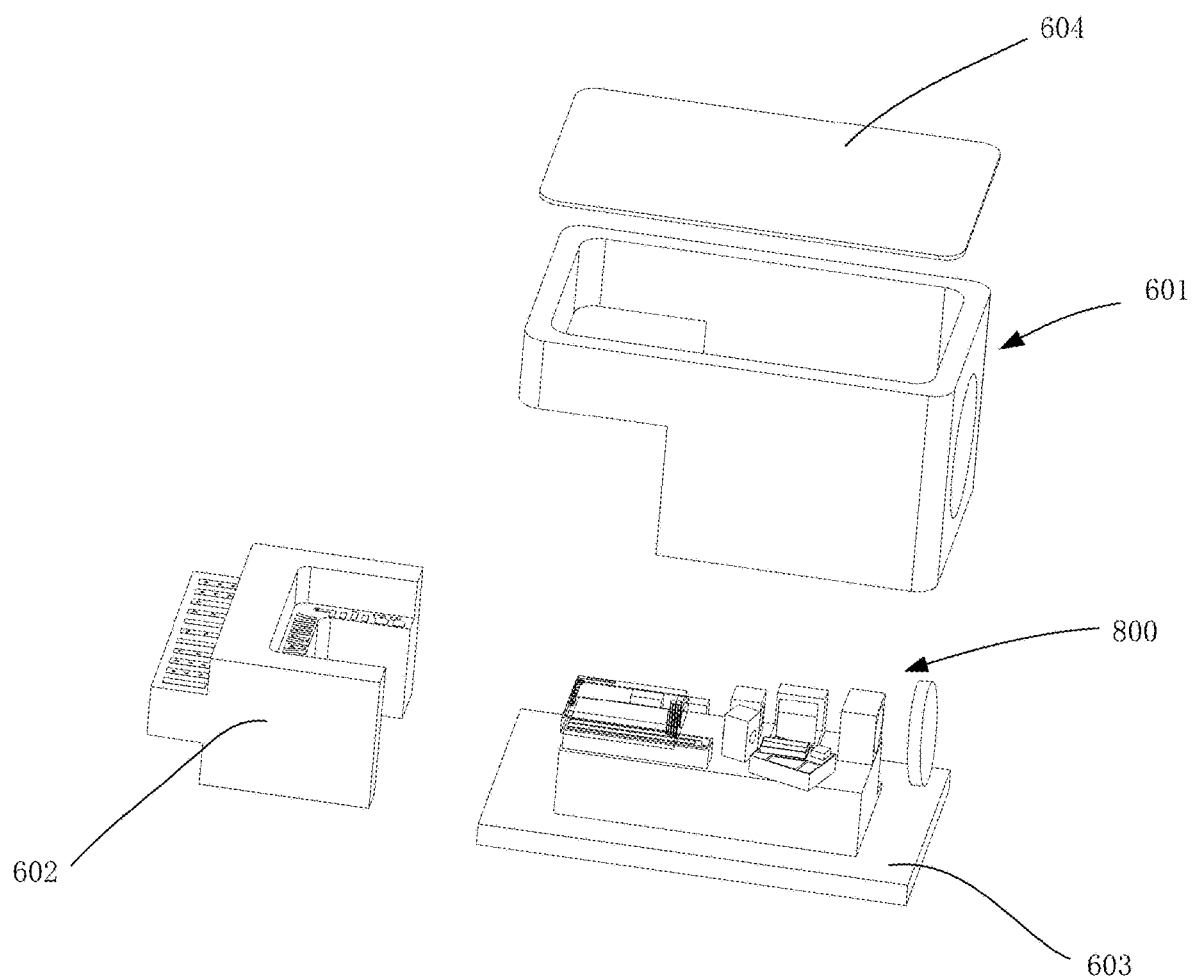
FIG. 6 is a schematic exploded diagram of the light-emitting assembly in an optical module according to an embodiment of the present disclosure.

FIG. 5 is a schematic structural diagram of a light-emitting assembly in an optical module according to an embodiment of the present disclosure, and FIG. 6 is a schematic exploded diagram of the light-emitting assembly in an optical module according to an embodiment of the present disclosure. As shown in FIG. 5 and FIG. 6, one end of the light-emitting assembly 400 is connected to the circuit board 300 via the flexible circuit board 500, and the circuit board 300 supplies power and provides high-frequency signals to the optical device of the light-emitting assembly 400 via the flexible circuit board 500; the other end of the light-emitting assembly 400 is connected to the optical fiber adapter 700, and the signal light emitted by the light-emitting assembly 400 is transmitted to the external optical fiber via the optical fiber adapter 700 for realizing an emission of the signal light.

The light-emitting assembly 400 comprises a housing 600 and a light-emitting device 800 disposed inside the housing 600. A notch is provides on the housing 600, and the flexible circuit board establishes electrical connections with the interior of the housing via said notch. There may be various designs for the notch. In one embodiment, a metallized ceramic 602 is provided at the notch, and is engaged with the notch hermetically. Pins are provided on an outer wall of the metallized ceramic 602, and the flexible circuit board 500 is connected with the pins to realize the connection between the flexible circuit board 500 and the light-emitting assembly 400. Pads are provided within the metallized ceramic 602, and the light-emitting device 800 is connected with the pads via gold wire bondings, such that the electrical signals, high frequency signals, etc. transmitted from the circuit board 300 to the light-emitting assembly 400 is transmitted to the light-emitting device 800, so that the light-emitting device 800 may emit signal lights. The metallized ceramic at the notch allows for an electrical connection between the flexible circuit board and the interior of the housing via the notch.

In another embodiment, a substrate is provided at the notch, and the flexible circuit board is located on the substrate with one end thereof protruding into the housing through the notch. The substrate is rigid, since the flexible circuit board is relatively flexible and is not easy to seal the notch, thus requires a rigid object to carry it while sealing the notch. The flexible circuit board passes through the notch, so that an electrical connection may be established between the flexible circuit board and the interior of the housing through the notch. The electrical devices (silicon optical chips, semiconductor refrigerators, etc.) inside the housing are connected, via gold wire bondings, to the flexible circuit board protruding into the housing.

As shown in FIG. 6, the housing 600 comprises a main housing 601, a bottom plate 603 and an upper cover plate 604, wherein the main housing 601, the metallized ceramic 602, the bottom plate 603 and the upper cover plate 604 together form a sealed cavity, and the light-emitting device 800 is provided within the sealed cavity.

Figure 7:
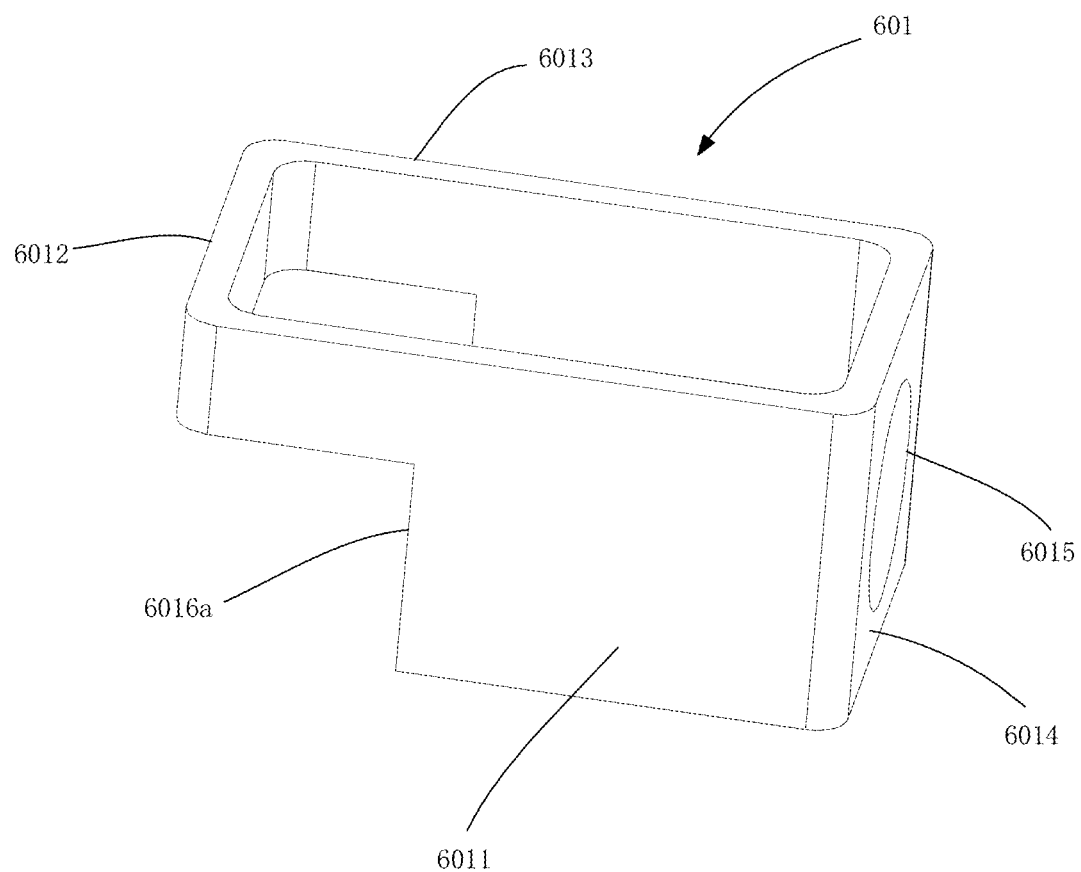
FIG. 7 is a schematic structural diagram of a housing in an optical module according to an embodiment of the present disclosure.

FIG. 7 is a schematic structural diagram of a housing in an optical module according to an embodiment of the present disclosure. As shown in FIG. 7, the main housing 601 comprises a first side plate 6011, a second side plate 6012, a third side plate 6013 and a fourth side plate 6014, which are sequentially connected to enclose an overall rectangular housing with upper and lower openings. The upper cover plate 604 is hermetically connected onto the upper opening of the main housing 601, and the bottom plate 603 is hermetically connected to the lower opening of the main housing 601. The notch 6016a is provided below the second side plate 6012 in the length direction of the first side plate 6011, and the metallized ceramic 602 is hermetically connected to the main housing 601 via the notch. The notch 6016a on the main housing 601 is located at a lower side of the second side plate 6012, while a top surface of the notch on the second side plate 6012 abuts against a top surface of the metallized ceramic 602, and side surfaces of the notch 6016a abuts against side surfaces of the metallized ceramic 602. In this example, the main housing 601 is an integrally formed metal housing.

Figure 8:
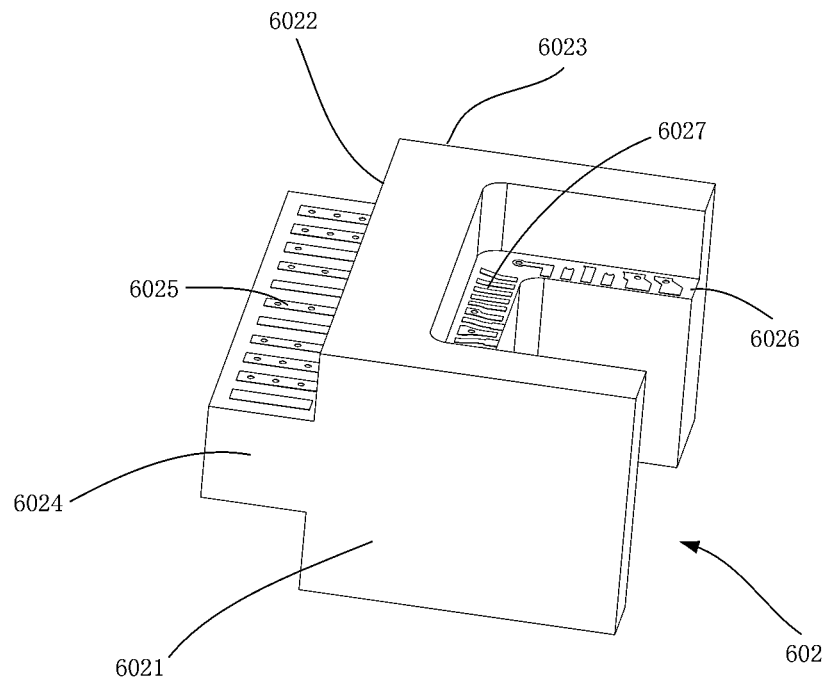
FIG. 8 is a schematic structural diagram of a metallized ceramic in an optical module according to an embodiment of the present disclosure.

FIG. 8 is a schematic structural diagram of a metallized ceramic in an optical module according to an embodiment of the present disclosure. As shown in FIG. 8, the metallized ceramic 602 comprises a fifth side plate 6021, a sixth side plate 6022 and a seventh side plate 6023, wherein two ends of the sixth side plate 6022 are respectively connected with the fifth side plate 6021 and the seventh side plate 6023; the fifth side plate 6021 as well as the seventh side plate 6023 is both arranged at an angle with respect to the sixth side plate 6022. That is, the fifth side plate 6021, the sixth side plate 6022 and the seventh side plate 6023 are connected to form a C-shaped block; the top surface of the C-shaped block is hermetically connected to the top surface of the notch 6016a, surfaces at the opening side of the C-shaped block is hermetically connected to the side surfaces of the notch 6016a, and a bottom surface of the C-shaped block is hermetically connected to an upper surface of the bottom plate 603.

A boss 6024 is provided on the sixth side plate 6022, pins 6025 are provided on a side surface of the boss 6024, and the flexible circuit board 500 is connected to the pins 6025, so as to transmit the signal on the circuit board 300 to the metallization ceramic 602 through the flexible circuit board 500. A groove 6026 is provided on the inner wall of the metallized ceramic 602, with pads 6027 being provided on the bottom surface of the groove 6026. The light-emitting device 800 can be connected to the pads 6027 via gold wire bondings, so as to transmit the signal transmitted by the metallized ceramic 602 to the light-emitting device 800.

In some embodiments of the present disclosure, a groove 6026 is provided in an inner side of the C-shaped block formed by the fifth side plate 6021, the sixth side plate 6022 and the seventh side plate 6023, and the groove 6026 is a C-shaped groove 6026 with pads 6027 being provided on the bottom surface of the groove; the light-emitting device 800 is enclosed by the inner walls connected with the bottom surface of the C-shaped groove 6026, so as to facilitate a connection between the pads 6027 and the light-emitting device 800 via gold wire bondings.

The housing 600 according to the present disclosure has a structural configuration in which the main housing 601, the metallized ceramic 602, the bottom plate 603 and the upper cover plate 604 are hermetically connected, which can facilitate the connection between the light-emitting device 800 and the flexible circuit board 500. During assembly, the light-emitting device 800 is firstly fixed onto the bottom plate 603, and then the main housing 601 is covered onto the bottom plate 603, so that the bottom surface of the main housing 601 and the upper side of the bottom plate 603 are soldered together and hermetically connected; then the metallized ceramic 602 is installed at the notch 6016a of the main housing 601, the bottom surface of the metallized ceramic 602 is soldered and hermetically connected to the upper side of the bottom plate 603, and the top surface as well as the side surfaces of the metallized ceramic 602 are respectively soldered and hermetically connected to the top surface as well as the side surfaces of the notch 6016a; afterwards, the upper cover plate 604 is covered onto the main housing 601, with the top surface of the main housing 601 being hermetically connected to a lower side of the upper cover plate 604, so that a hermetical assembly of the housing 600 is completed and the light-emitting device 800 is packaged within the housing 600.

The light-emitting device 800 is electrically connected to the circuit board 300 through the metallized ceramic 602 and the flexible circuit board 500; a distance between the pins 6025 on the metallized ceramic 602, which are connected to the flexible circuit board 500, and the pads 6027 is relatively small, such that a signal transmission distance is small, so that a loss of the signals transmitted from the circuit board 300 through the flexible circuit board 500 is relatively small.

A through hole 6015 is provided on the fourth side plate 6014 of the main housing 601, and the optical fiber adapter 700 is connected to the housing 600 through the through hole 6015 to complete an assembly of the optical fiber adapter 700 and the housing 600.

Figure 9:
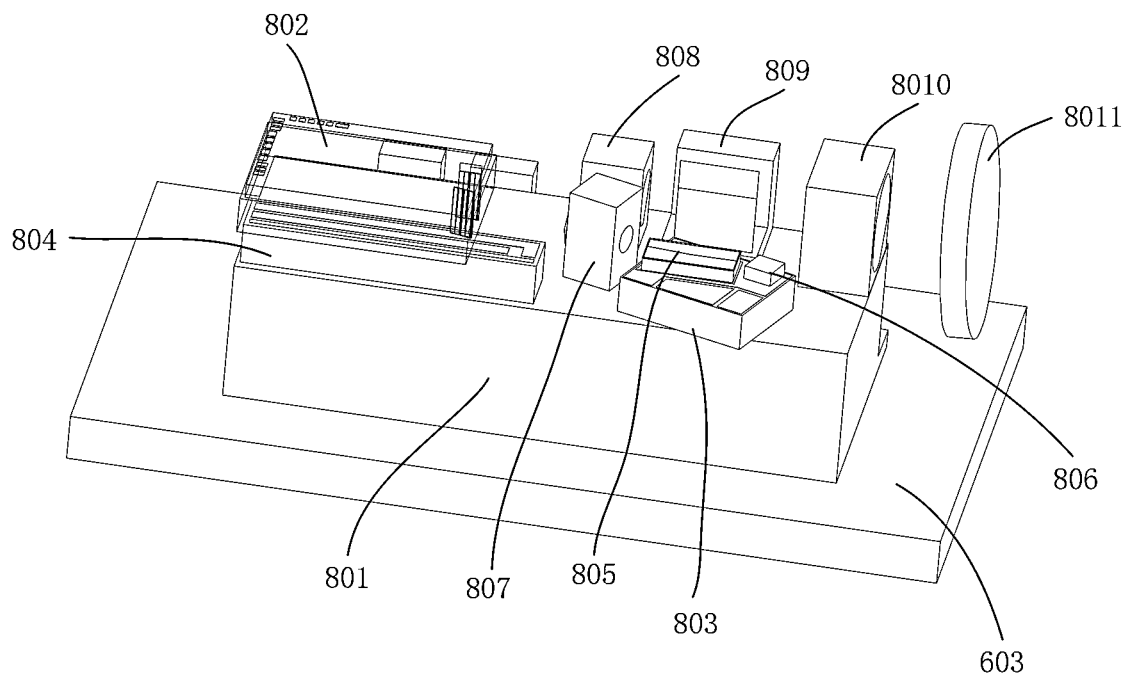
FIG. 9 is a schematic structural diagram of a light-emitting device in an optical module according to an embodiment of the present disclosure.

FIG. 9 is a schematic structural diagram of a light-emitting device in an optical module according to an embodiment of the present disclosure. As shown in FIG. 9, the light-emitting device comprises a semiconductor refrigerator 801, and a silicon optical chip 802, a semiconductor optical amplification chip 805 and a transfer ceramic board 804 arranged on the semiconductor refrigerator 801. The semiconductor refrigerator 801 is arranged on the bottom plate 603 for controlling the temperature inside the housing 600, and the silicon optical chip 802 and the semiconductor optical amplification chip 805 are both arranged on the surface of the semiconductor refrigerator 801 with a direct contact, which can ensure a better heat dissipation for the silicon optical chip 802 and the semiconductor optical amplification chip.

The silicon optical chip 802 is arranged in a light outputting direction of the semiconductor optical amplification chip 805; the semiconductor optical amplification chip 805 and the silicon optical chip 802 form a resonant cavity, and light emitted by the semiconductor optical amplification chip 805, which carries no signals, is incident onto the silicon optical chip 802 and interferes with the silicon optical chip 802; a part of the light returns to the semiconductor optical amplification chip 805 for resonance amplification, and so on, until the intensity of the light meets a standard requirement; the light so amplified is modulated by the silicon optical chip 802 to obtain a signal light; said signal light is emitted from the silicon optical chip 802 and then coupled to the optical fiber adapter 700 via lens, so as to realize an emission of the signal light.

A coupling lens 807 is also provided between the semiconductor optical amplification chip 805 and the silicon optical chip 802; the coupling lens 807 is a converging lens, which is used to converge the light emitted by the semiconductor optical amplification chip 805 onto the silicon optical chip 802, so as to improve a coupling efficiency of the optical path.

There is also provided a heat sink 803 between the semiconductor optical amplification chip 805 and the semiconductor refrigerator 801; the heat sink 803 is adhered on the upper surface of the semiconductor refrigerator 801; the semiconductor optical amplification chip 805 is adhered on the upper surface of the heat sink 803, so that heat generated by the semiconductor optical amplification chip 805 is conducted to the semiconductor refrigerator 801 through the heat sink 807, which may improve heat dissipation efficiency of the semiconductor optical amplification chip 805.

The semiconductor optical amplification chip 805 may emit lights of multiple wavelengths, and the lights of multiple wavelengths emitted by the semiconductor optical amplification chip 805 is amplified in the resonant cavity formed between the semiconductor optical amplification chip 805 and the silicon optical chip 802.

The silicon optical chip is capable of modulating light to generate signal light. The silicon optical chip comprises an optical filter, a light inputting port and a light outputting port. The light enters via the light inputting port of the silicon optical chip and emits from the light outputting port. The optical filter is arranged within the silicon optical chip. Light of multiple wavelengths from the light inputting port of the silicon optical chip passes through the optical filter, and the optical filter allows light of a specific wavelength to pass through according to its own wavelength bandpass characteristics, and the light of the specific wavelength is finally emitted from the light outputting port of the silicon optical chip. Wavelength selection of the optical filter in the silicon optical chip 802 is achieved by controlling the temperature of the optical filter. Specifically, the temperature of the silicon optical chip 802 can be controlled by the semiconductor refrigerator 801, so as to achieve the function of wavelength selection.

According to a possible embodiment, a thermistor 806 can be provided on the heat sink 803, and the thermistor 806, together with the semiconductor refrigerator 801, can control the temperature in the housing 600 to better control the temperature of the silicon optical chip 802, thereby improving wavelength selecting performance.

Figure 10:
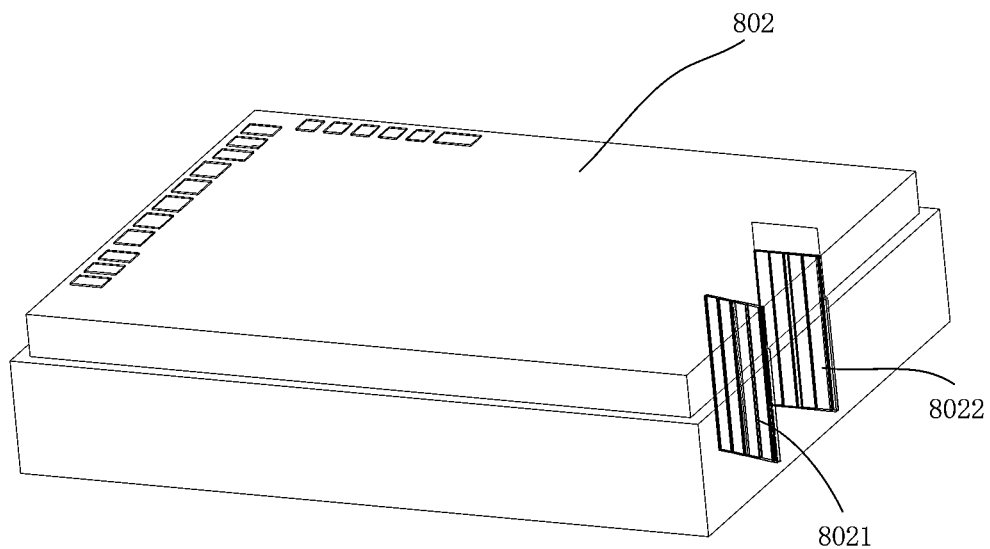
FIG. 10 is a schematic structural diagram of a silicon optical chip in an optical module according to an embodiment of the present disclosure.
Figure 11:
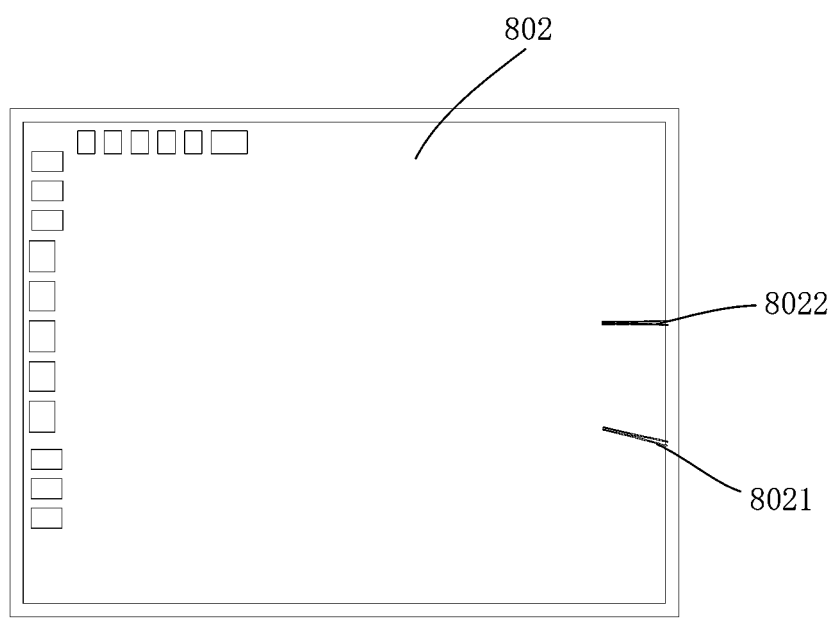
FIG. 11 is a schematic structural diagram from another viewing angle of the silicon optical chip in an optical module according to an embodiment of the present disclosure.

FIG. 10 is a schematic structural diagram of a silicon optical chip in an optical module according to an embodiment of the present disclosure, and FIG. 11 is a schematic structural diagram from another viewing angle of a silicon optical chip in an optical module according to an embodiment of the present disclosure. As shown in FIG. 10 and FIG. 11, the silicon optical chip 802 comprises an optical input port 8021 and an optical output port 8022; the optical input port 8021 is arranged in the light emitting direction of the semiconductor optical amplification chip 805, so that the light emitted by the semiconductor optical amplification chip 805 converges into the optical input port 8021 of the silicon optical chip 802 through the coupling lens 807, so as to facilitate an amplification of light in the resonant cavity formed by the silicon optical chip 802 and the semiconductor optical amplification chip 805.

In order to avoid crosstalks and return losses, the optical input port 8021 of the silicon optical chip 802 is arranged at an angle with respect to the end surface of the silicon optical chip 802, that is, the optical input port 8021 is arranged at an angle with respect to the horizontal plane; by this, an emitting end surface of the semiconductor optical amplification chip 805 is also arranged at an angle with respect to the horizontal plane, and similarly, a converging light path of the coupling lens 807 is also arranged at an angle with respect to the horizontal plane. This arrangement can prevent the light emitted from the semiconductor optical amplification chip 805 from being reflected at the end surface of the optical input port 8021 and returning to the semiconductor optical amplification chip 805 along the same path, and can similarly also prevent the light emitted from the semiconductor optical amplification chip 805 from being reflected at the end surface of the optical input port 8021 and entering into the silicon optical chip 802, thereby affecting signal modulation of the light in the silicon optical chip 802.

In an embodiment of the present disclosure, the angle between the emitting end surface of the semiconductor optical amplification chip 805 and the horizontal plane, the angle between the optical input port 8021 of the silicon optical chip 802 and the horizontal plane, and the angle between the converging optical path of the coupling lens 807 and the horizontal plane, are all 19.5°, which can ensure a maximum coupling efficiency of the optical path.

The optical output port 8022 and the optical input port 8021 of the silicon optical chip 802 have a preset angle for outputting modulated signal light of the corresponding wavelength; the signal light is converged and coupled into the optical fiber adapter 700, so the optical output port 8022 of the silicon optical chip 802 is located in the light incident direction of the optical fiber adapter 700. In order to couple the signal light output by the optical output port 8022 to the optical fiber adapter 700, a collimating lens 808 and a converging lens 8010 are arranged between the optical output port 8022 and the optical fiber adapter 700 in sequence, with the collimating lens 808 and the converging lens 8010 both being adhered onto the upper surface of the semiconductor refrigerator 801; the optical output port 8022, the collimating lens 808, the converging lens 8010 and the optical fiber adapter 700 are located on the same optical path. When the signal light output by the optical output port 8022 is incident into the collimating lens 808, the collimating lens 808 converts the signal light into a collimated beam which is incident into the converging lens 8010, and the converging lens 8010 converts the collimated beam into a converging beam that is coupled to the optical fiber adapter 700.

The converging beam is coupled into the optical fiber adapter 700, and tends to be reflected on the end surface of the fiber ferrule of the optical fiber adapter 700; the reflected beam tends to enter into the optical output port 8022 of the silicon optical chip 802 through the converging lens 8010 and the collimating lens 808, which will affect signal modulation of the silicon optical chip 802. To this end, an isolator 809 can be provided between the collimating lens 808 and the converging lens 8010. After the signal light is output from the optical output port 8022 of the silicon optical chip 802, it will be incident into the collimating lens 808; the collimating lens 808 converts the signal light into a collimated beam which passes through the isolator 809 and is then incident into the converging lens 8010. The converging lens 8010 converts the collimated beam into a converging beam which is coupled to the fiber adapter 700; the beam reflected on the end surface of the fiber ferrule of the optical fiber adapter 700 passes through the converging lens 8010 and then is incident into the isolator 809. The isolator 809 filters off the reflected beam so that the reflected beam cannot enter into the silicon optical chip 802, thereby avoiding return losses of light.

In the embodiment of the present disclosure, the transfer ceramic board 804 can be arranged in parallel with the silicon optical chip 802 on the upper surface of the semiconductor refrigerator 801, and the silicon optical chip 802 is directly connected with the pads 6027 on the metallized ceramic 602 via gold wire bondings, so as to receive the power supply and high-frequency signals transmitted from the circuit board 300 via the metallized ceramic 602; the semiconductor optical amplification chip 805, the thermistor 806 and other devices are respectively connected to the transfer ceramic board 804 via gold wire bondings, and the transfer ceramic board 804 is connected to the pads 6027 on the inner wall of the metallized ceramic 602 via gold wire bondings so as to receive powered signals transmitted by the circuit board 300 through the metallized ceramic 602; the semiconductor refrigerator 801 is electrically connected to the metallized ceramic 602 through the bottom plate 603 so as to receive the powered signals transmitted by the circuit board 300 via the metallized ceramic 602 and the bottom plate 603. In this way, the semiconductor optical amplification chip 805, instructed by the signal, emits light of multiple wavelengths; the semiconductor refrigerator 801, instructed by the signal, adjusts the temperature in the housing 600, so that the silicon optical chip 802 performs a wavelength selection via temperature control; the silicon optical chip 802 modulates the wavelength-selected light under the action of the signal to obtain signal light, and the signal light is coupled into the optical fiber adapter 700.

In another embodiment, the transition ceramic board 804 and the flexible circuit board 500 protruding into the housing are connected via gold wire bondings.

The flexible circuit board connected to the circuit board is the main body for electrical connection of the light-emitting assembly. Depending on the different sealing state of the light reflecting component, the flexible circuit board may extend into the housing of the light-emitting assembly, and the electrical devices in the housing may be directly connected to the flexible circuit board; as an alternative, the flexible circuit board does not extend into the housing of the light-emitting assembly, but is directly connected with the metallized ceramics at the notch, thus is indirectly connect with the electrical devices in the housing through the metallized ceramics.

A glass light window 8011 can also be provided between the converging lens 8010 and the fourth side plate 6014 of the main housing 601; the glass light window 8011 can be adhered on the inner side of the fourth side plate 6014, and the central axis of the glass light window 8011 is coincident with the central axis of the through hole 6015 on the fourth side plate 6014 to ensure the transmission of the converged beam from the inside to the outside of the housing 600.

Figure 12:
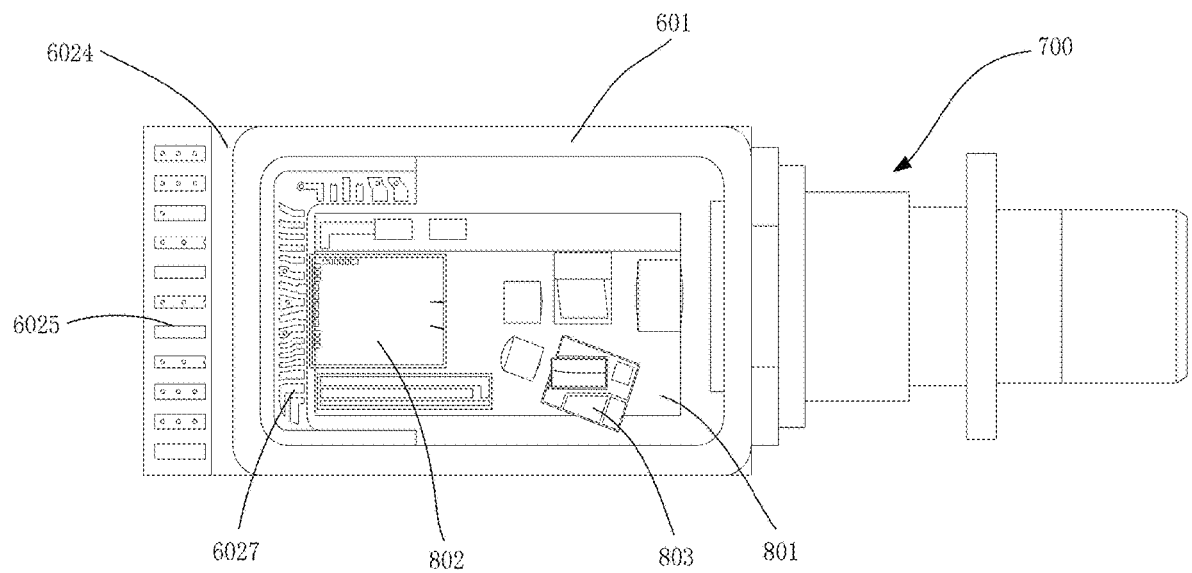
FIG. 12 is a partial top view of the light-emitting assembly in an optical module according to an embodiment of the present disclosure.
Figure 13:
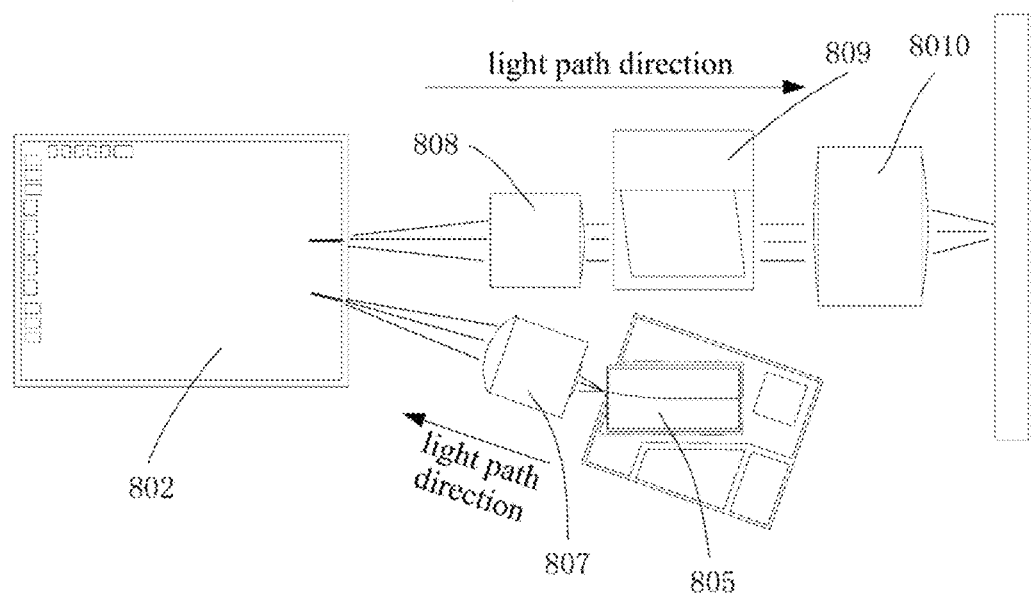
FIG. 13 is a schematic diagram illustrating an optical path of the light-emitting device in an optical module according to an embodiment of the present disclosure.

FIG. 12 is a partial top view of the light-emitting assembly in an optical module according to an embodiment of the present disclosure, and FIG. 13 is a schematic diagram illustrating an optical path of the light-emitting device in an optical module according to an embodiment of the present disclosure. As shown in FIG. 12 and FIG. 13, in the light-emitting assembly 400, the silicon optical chip 802 of the multi-wavelength tunable device and the semiconductor optical amplification chip 805 are together enclosed within the housing; the light-emitting assembly 400 has two optical paths at emitting end; for one of the two optical paths, the light emitted by the semiconductor optical amplification chip 805 is converged to the optical input port 8021 of the silicon optical chip 802 through the coupling lens 807, then passes through the resonant cavity formed between the silicon optical chip 802 and the semiconductor optical amplification chip 805 for resonance amplification; for the other optical path, the silicon optical chip 802 performs a wavelength selection for the resonance amplified light, and carries out a signal modulation for the wavelength-selected light therein; the modulated signal light is emitted from the optical output port 8022 of the silicon optical chip 802 after phase interference. The emitted signal light is converted into a collimated beam via the collimating lens 808, and the collimated beam is incident onto the converging lens 8010 after passing through the isolator 809; the signal light is then coupled to the optical fiber adapter 700 via the converging lens 8010, and is transmitted to external optical fibers via the optical fiber adapter 700 to realize light emission.

The specific installation steps of the light-emitting assembly 400 according to an embodiment of the present disclosure are as follows: firstly, the semiconductor optical amplification chip 805 is welded onto the heat sink 803; the thermistor 806 is then adhered on the corresponding position of the heat sink 803 by silver glue; afterwards, the semiconductor refrigerator 801 is adhered onto the bottom plate 603 of the housing 600 with silver glue for curing; the silicon optical chip 802, the heat sink 803 and the transfer ceramic board 804 are then adhered to the corresponding positions of the semiconductor refrigerator 801 by silver glue; then via gold wire bondings, the silicon optical chip 802 is electrically connected to the pads 6027 on the metallized ceramic 602, the semiconductor optical amplification chip 805 is electrically connected to the transfer ceramic board 804, the thermistor 806 is electrically connected to the transfer ceramic board 804, and the transfer ceramic board 804 is electrically connected to the pads 6027 on the metallized ceramic 602; the coupling lens 807 is then adhered on the corresponding position of the semiconductor refrigerator 801 according to the light emitting direction of the semiconductor optical amplification chip 805; the collimating lens 808 is then coupled in accordance with the light emitting direction of the silicon optical chip 802, and a light spot is inspected through an beam canner, and then the collimating lens 808 is adhered on the semiconductor refrigerator 801 according to the inspection results; afterwards, a chip mounter is used to passively adhere the isolator 809 and the converging lens 8010 on the semiconductor refrigerator 801; then a parallel sealing machine is used to seal the housing, that is, the parallel sealing machine is used to seal the main housing 601, the metallized ceramic 602, the bottom plate 603 and the upper cover plate 604, in order that the light-emitting device 800 is sealed within the housing 600; finally, the optical fiber adapter 700 is so coupled that a maximum optical power is achieved, and a laser welding machine is used to fix the optical fiber adapter 700 to the housing 600.

Figure 14:
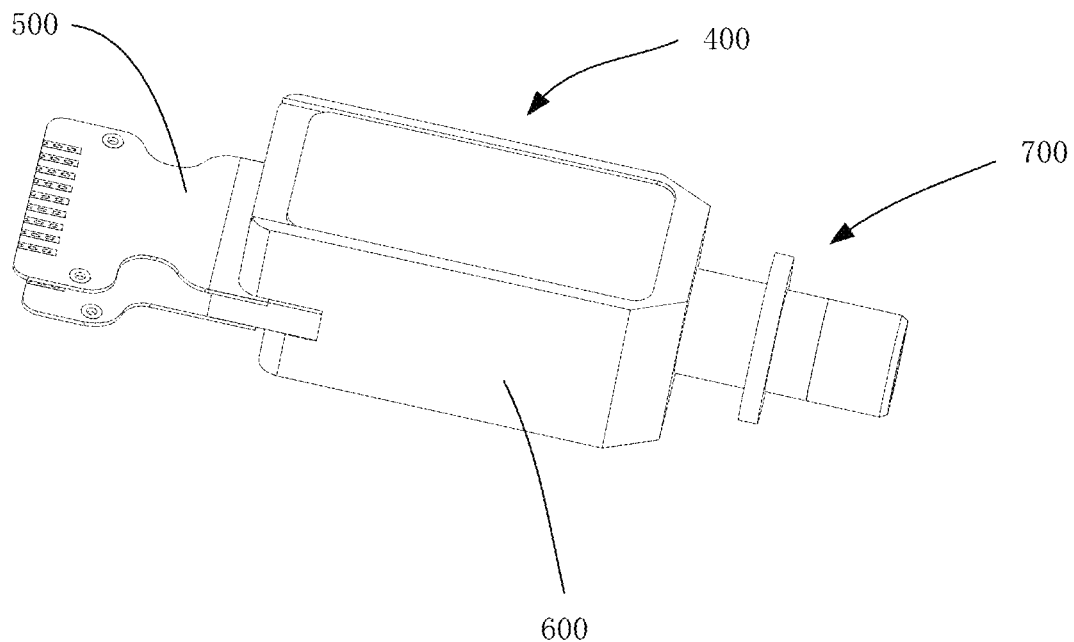
FIG. 14 is a schematic structural diagram of a light-emitting assembly in an optical module according to another embodiment of the present disclosure.
Figure 15:
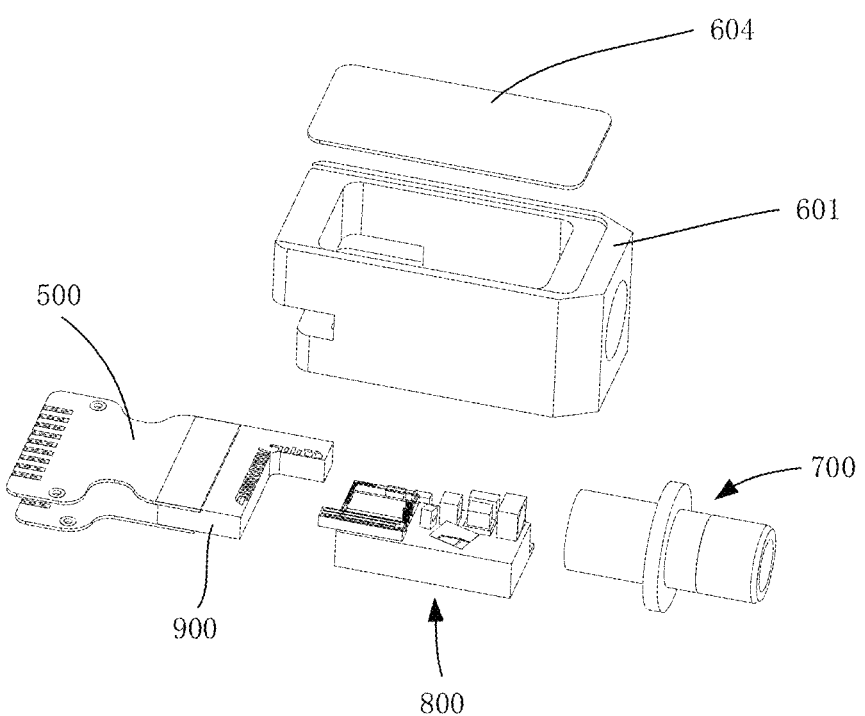
FIG. 15 is a schematic exploded diagram of the light-emitting assembly in the optical module according to another embodiment of the present disclosure.

FIG. 14 is a schematic structural diagram of a light-emitting assembly in an optical module according to another embodiment of the present disclosure, and FIG. 15 is a schematic exploded diagram of the light-emitting assembly in the optical module according to another embodiment of the present disclosure. As shown in FIG. 14 and FIG. 15, one end of the tunable light-emitting assembly 400 is connected to the circuit board 300 via the flexible circuit board 500, and the circuit board 300 supplies power and high frequency signals to the optical devices of the tunable light-emitting assembly 400 via the flexible circuit board 500; the other end of the tunable light-emitting assembly 400 is connected to the optical fiber adapter 700, and the signal light emitted by the tunable light-emitting assembly 400 is transmitted to external optical fibers via the optical fiber adapter 700 to realize an emission of the signal light.

The tunable light-emitting assembly 400 comprises a housing 600 and a light-emitting device 800 arranged in the housing 600. An insertion hole is provided in the housing 600 through which the flexible circuit board 500 can be inserted into the housing 600 for realizing a connection between the flexible circuit board 500 and the tunable light-emitting assembly 400. In an embodiment of the present disclosure, the housing 600 comprises a main housing 601, an upper cover plate 604 covering on the main housing 601, and a bottom plate 603 below the main housing, wherein the main housing 601 and the upper cover plate 604 form a housing with an internal cavity; the insertion hole is provided on a side face of the main housing 601, and the flexible circuit board 500 is inserted into the cavity of the main housing 601 through the insertion hole; in an embodiment of the present disclosure, the bottom plate 603 and the main housing 601 are integrally formed.

The light-emitting device 800 is connected to the flexible circuit board 500 via gold wire bondings, such that electrical signals, high frequency signals, etc. transmitted from the circuit board 300 to the tunable light-emitting assembly 400 may be transmitted to the light-emitting device 800, so that the light-emitting device 800 may emit signal light.

In an embodiment of the present disclosure, the tunable light-emitting assembly 400 may further comprise a transfer board 900, which is connected to the flexible circuit board 500 for supporting the flexible circuit board 500. The transfer board 900 can be inserted into the housing 600 through the insertion hole on the main housing 601 to achieve a connection between the flexible circuit board 500 and the light-emitting device 800.

Figure 16:
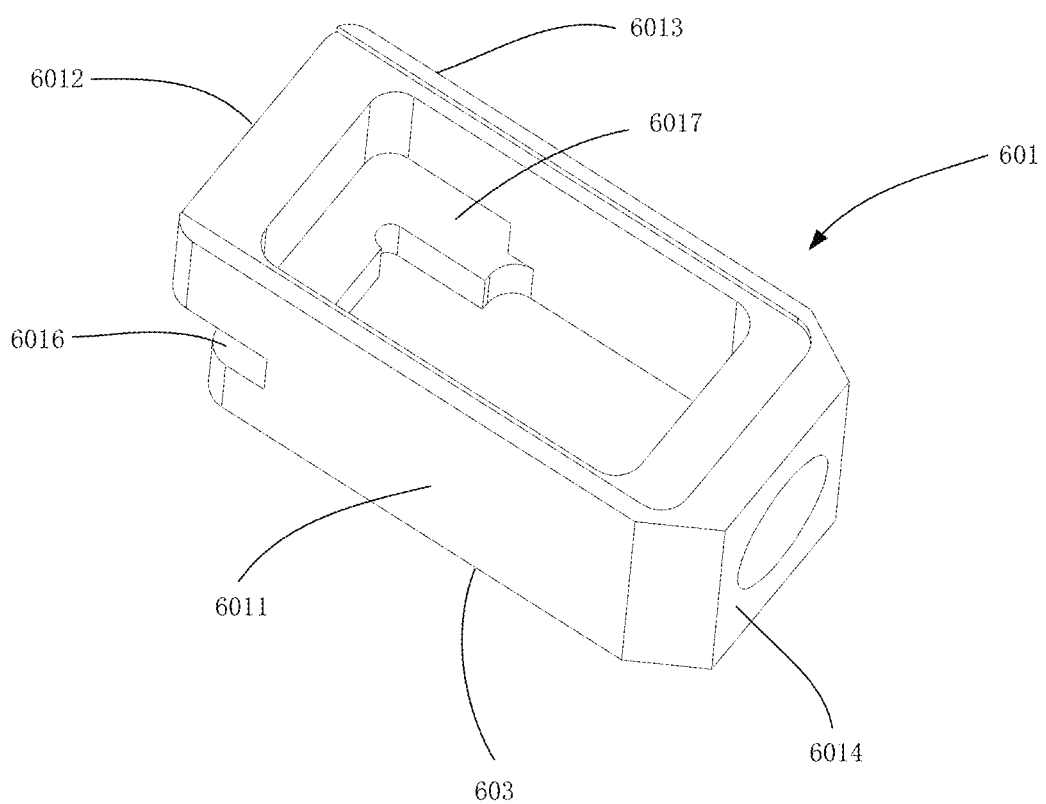
FIG. 16 is a schematic structural diagram of a housing in the optical module according to another embodiment of the present disclosure.
Figure 17:
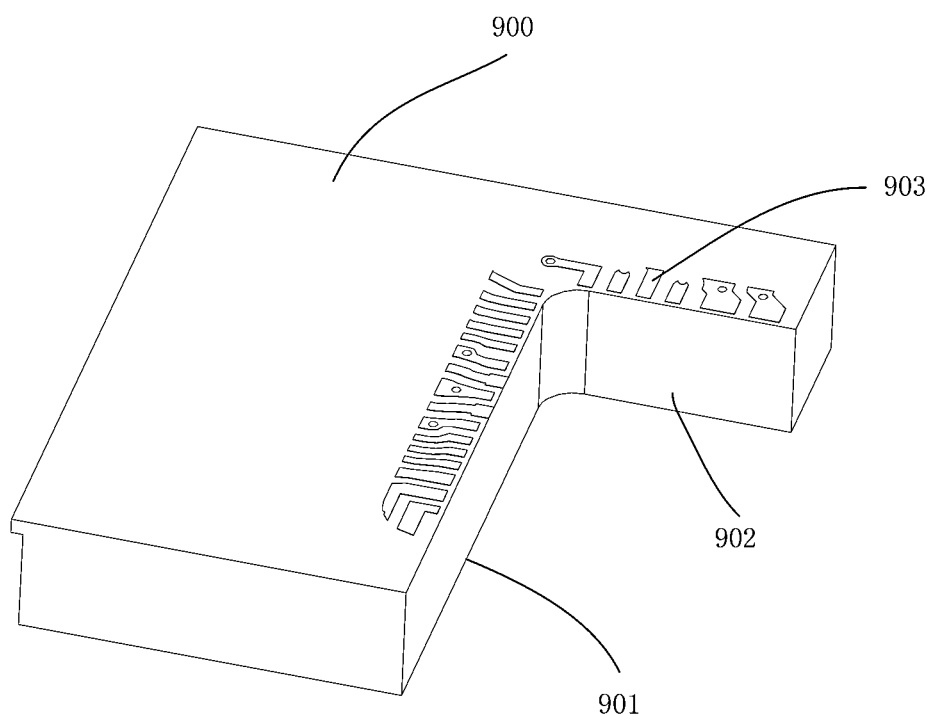
FIG. 17 is a schematic structural diagram of a transfer board in the optical module according to another embodiment of the present disclosure.

FIG. 16 is a schematic structural diagram of a housing in the optical module according to another embodiment of the present disclosure, and FIG. 17 is a schematic structural diagram of a transfer board in the optical module according to another embodiment of the disclosure. As shown in FIGS. 16 and 17, the main housing 601 comprises a first side plate 6011, a second side plate 6012, a third side plate 6013 and a fourth side plate 6014, which are respectively connected with the lateral sides of the bottom plate 603 to form a hollow housing with an open upper end. That is to say, the main housing 601 is a square body, the upper end of which is open, and the interior of which forms a cavity.

The notch provided on the side face of the main housing 601 comprises a first insertion hole 6016 and a second insertion hole 6017, wherein the first insertion hole 6016 is arranged in the second side plate 6012 of the main housing 601, the second insertion hole 6017 is arranged in the third side plate 6013 of the main housing 601, and the first insertion hole 6016 communicates with the second insertion hole 6017. In an embodiment of the present disclosure, the first insertion hole 6016 is provided in the second side plate 6012 along its length direction, and the length of the first insertion hole 6016 is the same as that of the second side plate 6012; the second insertion hole 6017 is provided in the third side plate 6013 along its length direction, while the length of the second insertion hole 6017 is smaller than that of the third side plate 6013; one end of the first insertion hole 6016 is communicated with one end of the second insertion hole 6017. In this way, an "L"-shaped insertion hole is formed on the left side of the main housing 601.

When the transfer board 900 is inserted into the insertion hole of the main housing 601, an end surface of the transfer board 900 that is inserted into the housing 600 abuts against an inner side wall of the second insertion hole 6017, and the end surface can be adhered onto the inner side wall of the second insertion hole 6017; the bottom surface of the transfer board 900 can also be adhered onto the bottom side walls of the first insertion hole 6016 and the second insertion hole 6017. In this way, the transfer board 900 can be fixed with the main housing 601.

The end of the transfer board 900 that is inserted into the housing 600 is provided with a notch that extends in a direction from the front side of the transfer board 900 to the rear side of the transfer board 900, and has a size that is smaller than the distance between the front side and the rear side of the transfer board 900; that is, the transfer board 900 has an "L"-shaped configuration with the notch provided thereon. When the transfer board 900 is inserted into the main housing 601, a first side 901 of the notch is flush with an inner side edge of the first insertion hole 6016, and a second side 902 of the notch is flush with an inner side edge of the second insertion hole 6017, so as to limit positioning of the transfer board 900.

In an embodiment of the present disclosure, pads 903 may also be provided on the transfer board 900, and the light-emitting device 800 may connected to the pads 903 via gold wire bondings, so that information transmitted by the flexible circuit board 500 can be transferred to the light-emitting device 800 through the transfer board 900; thus, the size of the flexible circuit board 500 can be reduced. Pads 903 may be arranged on the edge of the transfer board 900 along the notch, that is, the pads 903 may be arranged on the edge of the "L"-shaped notch. Since the light-emitting device 800 is arranged in the cavity of the housing 600, the transfer board 900 is inserted into the "L"-shaped insertion hole of the main housing 601, and the notch on the transfer board 900 encloses the light-emitting device 800, pads 903 are provided on the edge of the "L"-shaped notch, the light-emitting device 800 is enclosed in the "L"-shaped notch; by this, provision of pads on the edge of the "L"-shaped notch is beneficial for a connection with the light-emitting device 800.

In an embodiment of the present disclosure, the transfer board 900 is packaged into the housing 600 via a non-airtight packaging; the transfer board 900 is inserted into the housing 600, with one end of the transfer board 900 being connected to the flexible circuit board 500 and the other end being connected to the light-emitting device 800, which facilitates a connection between the light-emitting device 800 and the flexible circuit board 500. During assembling, firstly, the light-emitting device 800 is secured in the cavity of the main housing 601, then the transfer board 900 is inserted into the insertion hole of the main housing 601 and is fixed in the main housing 601; components of the light-emitting device 800 are connected to the pads 903 on the transfer board 900 via gold wire bondings; then the upper cover plate 604 of the housing 600 is covered on the upper end of the main housing 601; afterwards, the transfer board 900 is connected to the flexible circuit board 500.

When the transfer board 900 is connected to the flexible circuit board 500, since there are so many signals to be transmitted, the transfer board 900 may be connected to a plurality of flexible circuit boards 500. In an embodiment of the present disclosure, the flexible circuit board 500 comprises a RF flexible circuit board and a DC flexible circuit board, the RF flexible circuit board is connected to an upper side of the transfer board 900, and the DC flexible circuit board is connected to a lower side of the transfer board 900, such that high-frequency signals (modulated signals) transmitted by the circuit board 300 are guided to the transfer board 900 through the RF flexible circuit board, and electrical signals transmitted by the circuit board 300 are guided to the transfer board 900 through the DC flexible circuit board, so as to achieve connection between the circuit board 300 and the tunable light-emitting assembly 400 respectively.

A through hole is provided on the fourth side plate 6014 of the main housing 601, and the optical fiber adapter 700 is connected to the housing 600 via the through hole, so as to realize an assembly of the optical fiber adapter 700 with the housing 600.

Figure 18:
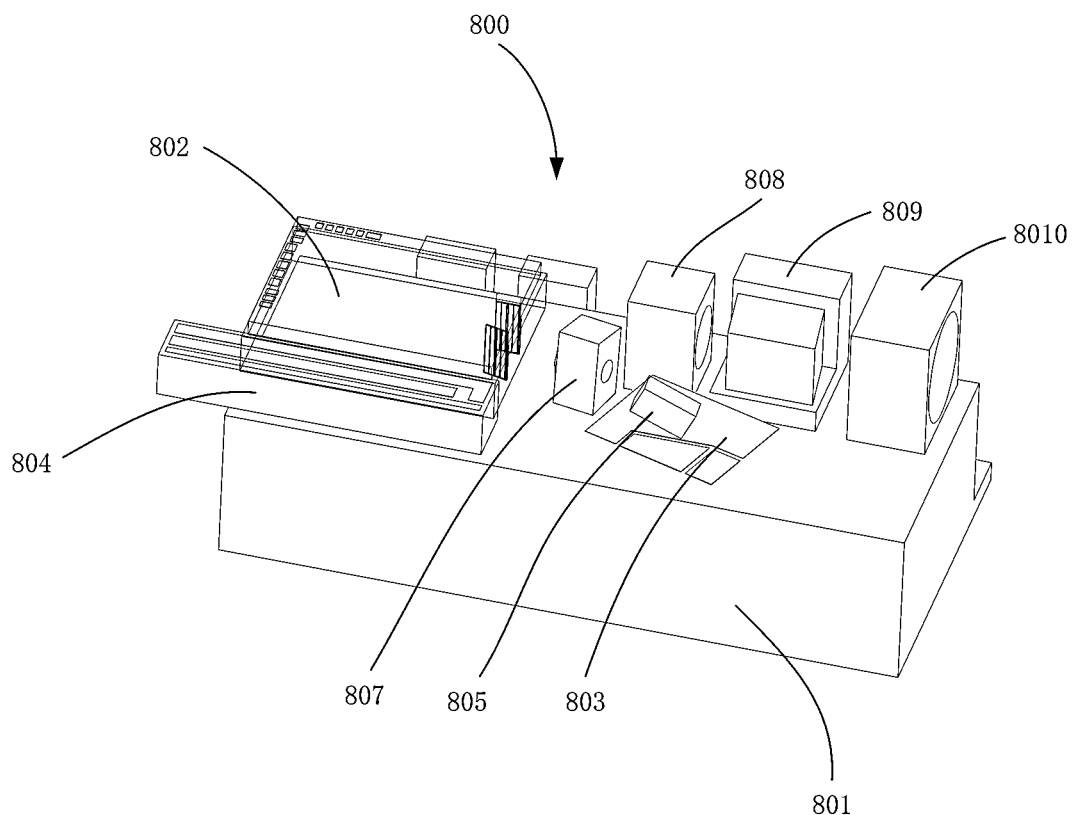
FIG. 18 is a schematic structural diagram of a light-emitting device in the optical module according to another embodiment of the present disclosure.

FIG. 18 is a schematic structural diagram of a light-emitting device in the optical module according to another embodiment of the present disclosure. As shown in FIG. 18, the light-emitting device 800 comprises a semiconductor refrigerator 801, and a silicon optical chip 802, a semiconductor optical amplification chip 805 and a transfer ceramic board 804 arranged on the semiconductor refrigerator 801. The semiconductor refrigerator 801 is arranged on the bottom plate 603 for controlling the temperature in the housing 600. The silicon optical chip 802 and the semiconductor optical amplification chip 805 are both arranged in direct contact with a surface of the semiconductor refrigerator 801, which can ensure a better heat dissipation for the silicon optical chip 802 and the semiconductor optical amplification chip 805.

The silicon optical chip 802 is arranged in the light emitting direction of the semiconductor optical amplification chip 805, and the semiconductor optical amplification chip 805 and the silicon optical chip 802 form a resonant cavity therebetween; light of multiple wavelengths emitted by the semiconductor optical amplification chip 805 propagates into the silicon optical chip 802, is reflected in the silicon optical chip 802; a part of the light returns to the semiconductor optical amplification chip 805 for resonance amplification, and so on, until the intensity of the light meets a standard requirement; the light so amplified light undergoes wavelength selection in the silicon optical chip 802 and is modulated to obtain a signal light; said signal light, is emitted from the silicon optical chip 802 and then coupled to the optical fiber adapter 700 via lens, so as to realize an emission of the signal light.

A coupling lens 807 is further provided between the semiconductor optical amplification chip 805 and the silicon optical chip 802; the coupling lens 807 is a converging lens, which is used for converging the light emitted by the semiconductor optical amplification chip 805 onto the silicon optical chip 802, so as to improve a coupling efficiency of the optical path.

A heat sink 803 is further provided between the semiconductor optical amplification chip 805 and the semiconductor refrigerator 801; the heat sink 803 is adhered on the upper surface of the semiconductor refrigerator 801; the semiconductor optical amplification chip 805 is adhered on the upper surface of the heat sink 803, so that heat generated by the semiconductor optical amplification chip 805 is conducted to the semiconductor refrigerator 801 through the heat sink 803, which may improve heat dissipation efficiency of the semiconductor optical amplification chip 805.

The light emitted by the semiconductor optical amplification chip 805 is amplified in the resonant cavity formed between the semiconductor optical amplification chip 805 and the silicon optical chip 802, and the amplified light is subjected to wavelength selection and signal modulation etc. in the silicon optical chip 802. The silicon optical chip 802 can perform wavelength selection via temperature control, so that a temperature of the silicon optical chip 802 may be controlled by the semiconductor refrigerator 801, so as to achieve the function of wavelength selection. A thermistor can also be provided on the heat sink 803, and control the temperature in the housing 600 together with the semiconductor refrigerator 801, so as to better control the temperature of the silicon optical chip 802, thereby improving the wavelength selection performance.

Figure 19:
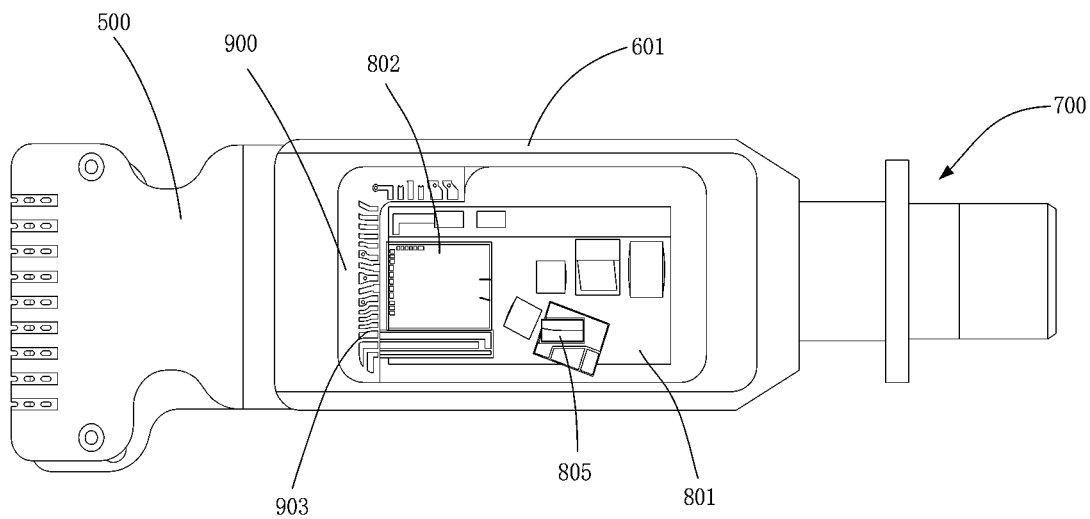
FIG. 19 is a partial top view of the light-emitting assembly in the optical module according to another embodiment of the present disclosure.

FIG. 19 is a partial top view of the light-emitting assembly in the optical module according to another embodiment of the present disclosure. As shown in FIG. 19, in the light-emitting assembly 400, the silicon optical chip 802 of the multi-wavelength tunable device and the semiconductor optical amplification chip 805 are together enclosed in the housing 600; the light-emitting assembly 400 has two optical paths at the emitting end; or one of the two optical paths, the light emitted by the semiconductor optical amplification chip 805 is converged to the optical input port 8021 of the silicon optical chip 802 through the coupling lens 807, then passes through the resonant cavity formed between the silicon optical chip 802 and the semiconductor optical amplification chip 805 for resonance amplification; for the other optical path, the silicon optical chip 802 performs a wavelength selection for the resonance amplified light, and carries out a signal modulation for the wavelength-selected light therein; the modulated signal light is emitted from the optical output port 8022 of the silicon optical chip 802 after phase interference. The emitted signal light is converted into a collimated beam via the collimating lens 808, and the collimated beam is incident onto the converging lens 8010 after passing through the isolator 809; the signal light is then coupled to the optical fiber adapter 700 via the converging lens 8010, and is transmitted to external optical fibers via the optical fiber adapter 700 to realize light emission.

The specific installation steps of the light-emitting assembly 400 according to an embodiment of the present disclosure are as follows: firstly, the semiconductor optical amplification chip 805 is welded onto the heat sink 803; the thermistor 806 is then adhered on the corresponding position of the heat sink 803 by silver glue; afterwards, the semiconductor refrigerator 801 is adhered onto the bottom plate 603 of the housing 600 with silver glue for curing; the silicon optical chip 802, the heat sink 803 and the transfer ceramic board 804 are then adhered to the corresponding positions of the semiconductor refrigerator 801 by silver glue; then via gold wire bondings, the silicon optical chip 802 is electrically connected to the flexible circuit board 500, the semiconductor optical amplification chip 805 is electrically connected to the transfer ceramic board 804, the thermistor 806 is electrically connected to the transfer ceramic board 804, and the transfer ceramic board 804 is electrically connected to the flexible circuit board 500; the coupling lens 807 is then adhered on the corresponding position of the semiconductor refrigerator 801 according to the light emitting direction of the semiconductor optical amplification chip 805; the collimating lens 808 is then coupled in accordance with the light emitting direction of the silicon optical chip 802, and a light spot is inspected through a beam canner, and then the collimating lens 808 is adhered on the semiconductor refrigerator 801 according to the inspection results; afterwards, a chip mounter is used to passively adhere the isolator 809 and the converging lens 8010 on the semiconductor refrigerator 801; then, the upper cover plate 604 is adhered to the upper end surface of the main housing 601 for sealing; finally, the optical fiber adapter 700 is so coupled that a maximum optical power is achieved, and a laser welding machine is used to fix the optical fiber adapter 700 to the housing 600.

Since silicon optical chips have the advantages of low optical loss, high integration density and compatibility with CMOS, they have great application potential in developing low-cost, high-speed optoelectronic devices. The present disclosure encloses silicon optical chips into 25G wireless tunable wavelength optical devices, which promotes an application and development of silicon optical technology in optical modules. In the present disclosure, the silicon optical chip and the semiconductor optical amplification chip are enclosed together, and a wavelength tuning is performed based on the silicon optical chip and the semiconductor optical amplification chip, so that the optical module has a multi-wavelength tuning function, and has the advantages of low cost, wide tuning range and low power consumption, etc., which is a preferred solution for 25G colorless optical modules.

Finally, it should be noted that the foregoing embodiments are merely intended to describe the technical solutions of the present disclosure, and shall not be construed as limitation. Although the present disclosure is described in detail with reference to the foregoing embodiments, one of ordinary skills in the art may understand that modifications still may be made to the technical solutions disclosed in the foregoing embodiments, or equivalent replacements may be made to some of the technical features. However, these modifications or equivalent replacements do not deviate the nature of corresponding technique solutions from the spirit and scope of the technique solutions of the embodiments of the present disclosure.

What is claimed is:

1. An optical module, comprising:
   a circuit board;
   a light-emitting assembly, which is electrically connected to the circuit board through a flexible circuit board for emitting signal light;
   wherein the light-emitting assembly comprises:
   a housing, a side wall of which is provided with a notch through which the flexible circuit board is electrically connected to an interior of the housing;
   a metallized ceramic provided at the notch of the housing, one end of which is located outside the housing and pins are provided on an outer wall of the metallized ceramic, with the flexible circuit board being electrically connected with the pins; another end of the metallized ceramic is located inside the housing and is provided with a pad electrically connected with the pins;
   a semiconductor refrigerator provided on a bottom surface of the housing for temperature adjustment;
   a transfer ceramic board arranged on the semiconductor refrigerator, with one end of the transfer ceramic board being electrically connected to the pad;
   a silicon optical chip provided on a surface of the semiconductor refrigerator and being electrically connected to the pad, which may perform light modulation to generate a signal light, wherein the silicon optical chip comprises a filter, a light inputting port and a light outputting port, and light inside the silicon optical chip passes through the filter, wherein the light inputting port is arranged at a first angle with respect to a horizontal plane; and
   a semiconductor optical amplification chip provided on the surface of the semiconductor refrigerator and farther away from the pad with respect to the silicon optical chip, wherein the semiconductor optical amplification chip is electrically connected to another end of the transfer ceramic board, wherein light of multiple wavelengths emitted by the semiconductor optical amplification chip can propagate into the silicon optical chip through the light inputting port, wherein an emitting end surface of the semiconductor optical amplification chip is also arranged at the first angle with respect to the horizontal plane; and
   a converging lens configured for converging light emitted from the light outputting port of the silicon optical chip.

2. The optical module according to claim 1, wherein the light-emitting assembly further comprises:
   a coupling lens provided between the semiconductor optical amplification chip and the silicon optical chip, which is capable of coupling light from the semiconductor optical amplification chip into the light inputting port of the silicon optical chip;
   a collimating lens provided between the silicon optical chip and the converging lens, which is capable of collimating the light emitted from the light outputting port of the silicon optical chip into collimated light;
   an isolator provided between the collimating lens and the converging lens, wherein only light in one single direction may pass through said isolator; and
   an optical fiber adapter provided on the housing, which is capable of receiving light from the converging lens.

3. The optical module according to claim 1, wherein the light-emitting assembly further comprises:

a substrate provided at the notch of the housing, wherein the flexible circuit board is mounted on the substrate with one end thereof protruding into the housing through the notch.

4. The optical module according to claim 1, wherein a heat sink is provided between the semiconductor optical amplification chip and the semiconductor refrigerator, and a thermistor is provided on the heat sink.

5. The optical module according to claim 1, wherein the housing comprises a main housing, an upper cover plate and a bottom plate covering the main housing, wherein the main housing comprises a first side plate, a second side plate, a third side plate and a fourth side plate, which are connected in sequence to form a hollow housing;

wherein the notch is arranged in the second side plate along a length direction of the first side plate, and the metallized ceramic is hermetically connected to the main housing through the notch.

6. The optical module according to claim 4, wherein the metallized ceramic comprises a fifth side plate, a sixth side plate and a seventh side plate, two ends of the sixth side plate are respectively connected with the fifth side plate and the seventh side plate, wherein the fifth side plate and the seventh side plate are both arranged at an angle with respect to the sixth side plate; wherein side faces of the fifth side plate, the sixth side plate and the seventh side plate are respectively hermetically connected to side faces of the notch;

a boss is provided on the sixth side plate, with pins being arranged on the boss.

7. The optical module according to claim 1, wherein the silicon optical chip is connected to the metallized ceramic via gold wire bondings.

8. The optical module according to claim 3, wherein the silicon optical chip is connected to the flexible circuit board via gold wire bondings.

9. The optical module according to claim 1, wherein the metallized ceramic is hermetically engaged with the notch;

the semiconductor optical amplification chip is provided in the housing;

the transfer ceramic board is provided in the housing, wherein the semiconductor optical amplification chip is electrically connected to the transfer ceramic board via gold wire bondings, and the transfer ceramic board is electrically connected to the pad via gold wire bondings;

the silicon optical chip is provided in the housing and electrically connected to the pad via gold wire bondings to carry out a wavelength selection for the light of multiple wavelengths, wherein the wavelength-selected light is modulated to obtain signal light of corresponding wavelength.

10. The optical module according to claim 9, wherein a groove is provided on an inner wall of the metallized ceramic, with the pad being arranged on the bottom surface of the groove.

11. The optical module according to claim 9, wherein the light inputting port of the silicon optical chip is arranged in a light emitting direction of the semiconductor optical amplification chip, and there is a preset angle between the optical output port and the light inputting port.

12. The optical module according to claim 9, wherein the semiconductor refrigerator is arranged in the housing, and the semiconductor optical amplification chip, the silicon optical chip and the transfer ceramic plate are all provided on the semiconductor refrigerator.

* * * * *